(12) United States Patent
Kato

(10) Patent No.: US 7,869,690 B2
(45) Date of Patent: Jan. 11, 2011

(54) APPARATUS AND METHOD FOR RECORDING AV STREAMS ONTO A RECORDING MEDIUM WITH REPRODUCTION PATH CHANGE POINT FEATURES

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1623 days.

(21) Appl. No.: 10/500,147

(22) PCT Filed: Nov. 6, 2003

(86) PCT No.: PCT/JP03/14133

§ 371 (c)(1),
(2), (4) Date: May 5, 2005

(87) PCT Pub. No.: WO2004/045206

PCT Pub. Date: May 27, 2004

(65) Prior Publication Data

US 2005/0206783 A1    Sep. 22, 2005

(30) Foreign Application Priority Data

Nov. 11, 2002  (JP) .............................. 2002-327450
Jan. 31, 2003  (JP) .............................. 2003-023084
Mar. 19, 2003  (JP) .............................. 2003-075579
Jun. 3, 2003   (JP) .............................. 2003-157787

(51) Int. Cl.
*H04N 5/85* (2006.01)
(52) U.S. Cl. ........................................ 386/95; 386/126
(58) Field of Classification Search .................. 386/95, 386/108, 109, 111, 112, 122, 125–126
See application file for complete search history.

(56) References Cited

U.S. PATENT DOCUMENTS

| 5,870,523 | A | * | 2/1999 | Kikuchi et al. ................. 386/95 |
| 5,895,124 | A | * | 4/1999 | Tsuga et al. ................... 386/98 |
| 6,324,335 | B1 | * | 11/2001 | Kanda .......................... 386/52 |
| 7,356,247 | B2 | * | 4/2008 | Hamasaka et al. ............. 386/95 |
| 7,606,465 | B2 | * | 10/2009 | Seo et al. ....................... 386/95 |
| 7,672,567 | B2 | * | 3/2010 | Seo et al. ....................... 386/69 |
| 7,720,356 | B2 | * | 5/2010 | Seo et al. ....................... 386/95 |
| 2003/0235406 | A1 | * | 12/2003 | Seo et al. ....................... 386/95 |

FOREIGN PATENT DOCUMENTS

| EP | 1 555 818 A1 | 7/2005 |
| EP | 1 566 965 A1 | 8/2005 |
| JP | 2002-157859 | 5/2002 |
| JP | 2002-158971 | 5/2002 |

(Continued)

*Primary Examiner*—David E Harvey
(74) *Attorney, Agent, or Firm*—Oblon, Spivak, McClelland, Maier & Neustadt, L.L.P.

(57) ABSTRACT

The present invention facilitates reading in advance information on addresses where data of each reproduction path to be reproduced is stored. Clip AV stream 1 to Clip AV stream 3 of angles forming a multiangle are managed by PlayList#1 to PlayList#3 for the different angles. Each of PlayList#1 to PlayList#3 is divided by angle change points. Each of the divided reproducing sections corresponds to a PlayItem. Correspondences between source packet numbers and presentation time stamps of the angle change points are recorded in an EP_map. The present invention is applicable to DVD recording and reproducing apparatus, for example.

11 Claims, 26 Drawing Sheets

FOREIGN PATENT DOCUMENTS

| | | |
|---|---|---|
| JP | 2002-313066 | 10/2002 |
| WO | WO98/24091 * | 4/1998 |
| WO | WO 2004/001754 A1 | 12/2003 |
| WO | WO 2004/003908 A1 | 1/2004 |
| WO | WO 2004/036580 A1 | 4/2004 |

* cited by examiner

FIG. 16

```
PlayItem{
 if(MultiAngle type) {
  num_of_angles
  for(angle=0; angle<num_of_angles; angle++) {     ← Clip Information 1,
   Clip_information_file_name[angle]                  Clip Information 2,
  }                                                   Clip Information 3,
  IN_time                                          ← T1
  OUT_time                                         ← T4
  num_of_entry_points
  for(i=0; i<num_of_entry_points; i++) {           ← T2, T3
   entry_time[i]
  }
 }
}
```

F I G. 2 2
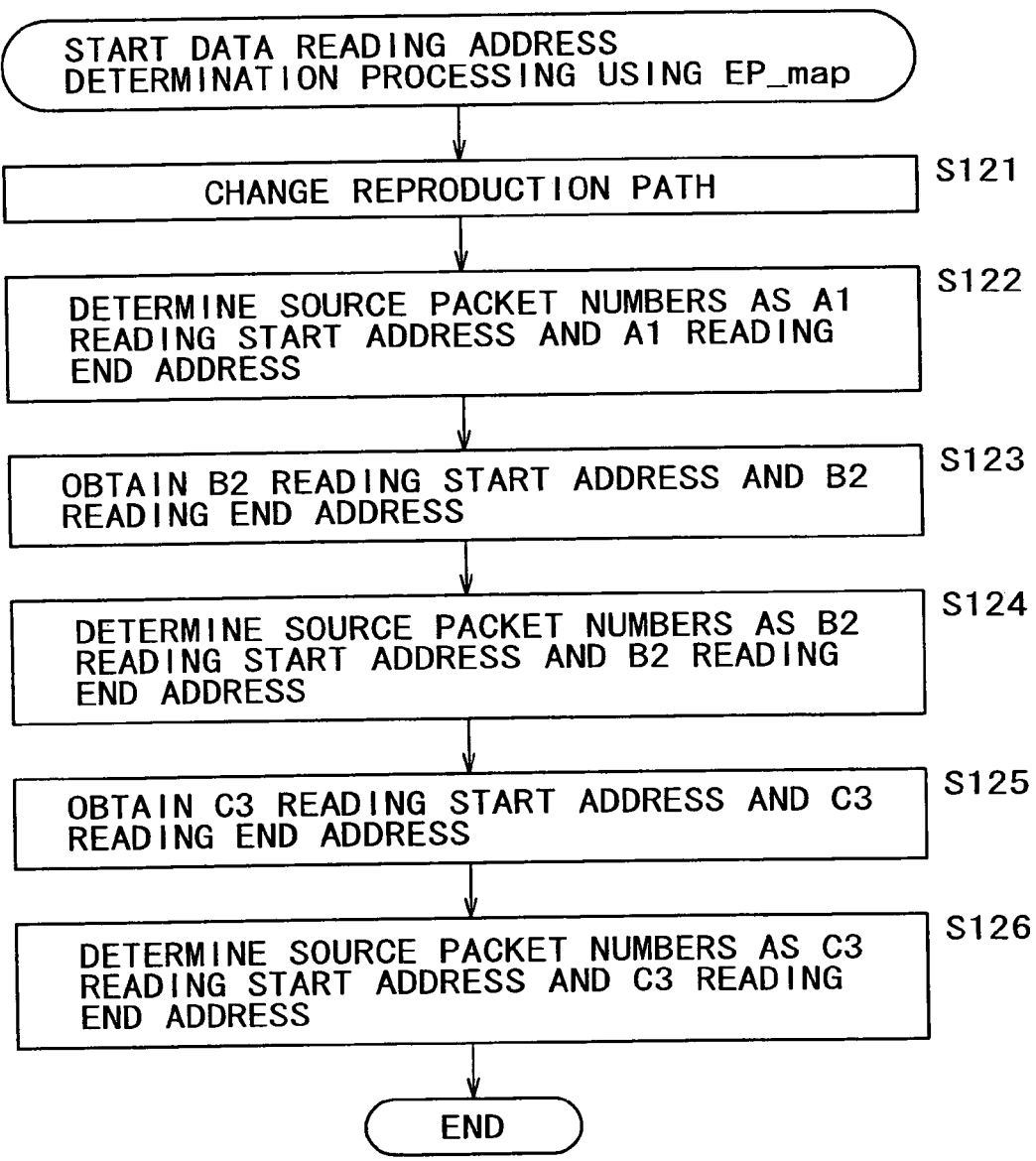

F I G. 2 4

```
PlayList{
      num_of_PlayItems
      for(i=0; i<num_of_PlayItems; i++){
            PlayItem()
      }
}

PlayItem(){
    if(MultiAngle type){
        num_of_angles
        for(angle=0; angle<num_of_angles; angle++){
            Clip_information_file_name[angle]
        }
    }else{
        Clip_information_file_name
    }

IN_time
    OUT_time
}
```

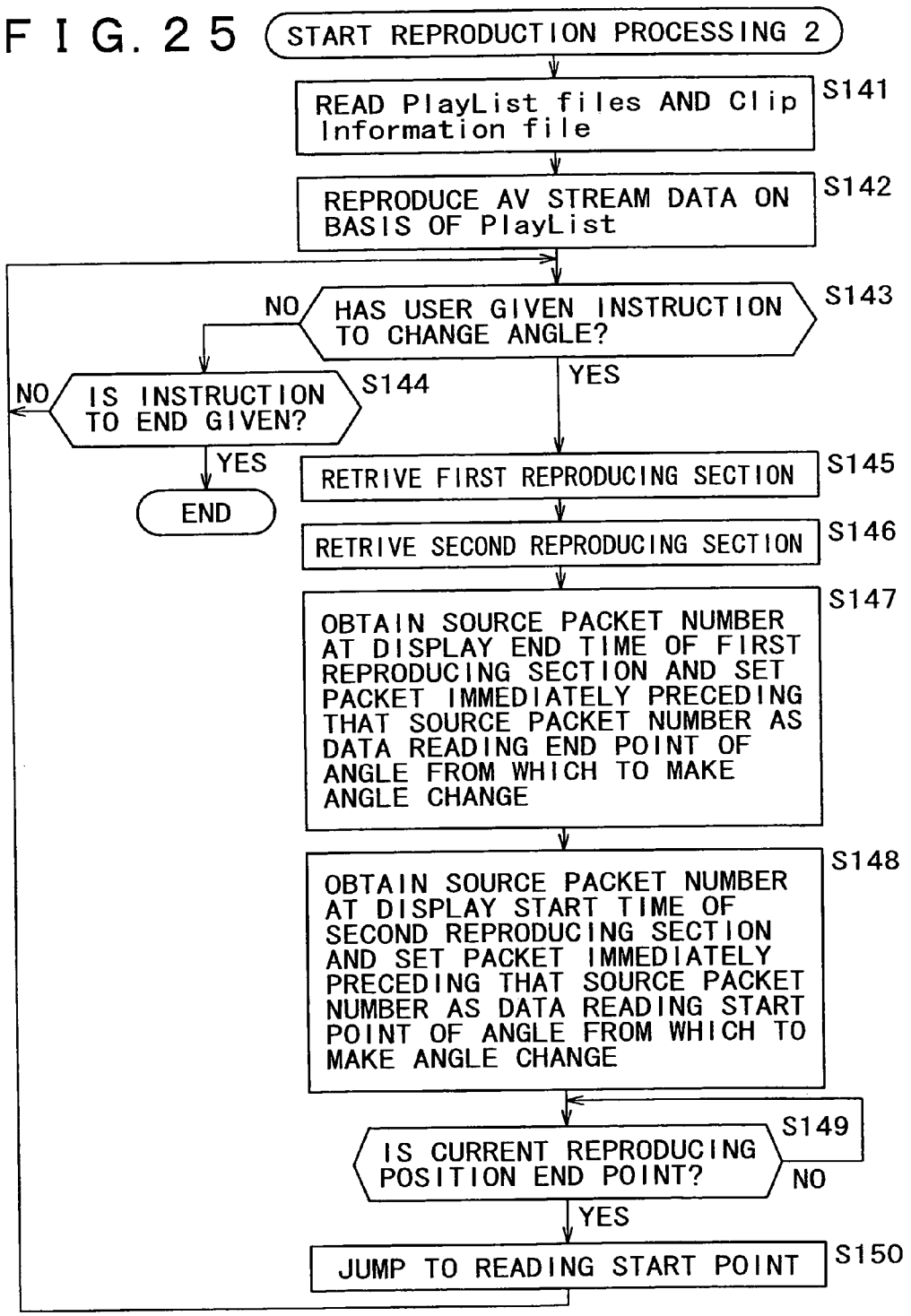

APPARATUS AND METHOD FOR RECORDING AV STREAMS ONTO A RECORDING MEDIUM WITH REPRODUCTION PATH CHANGE POINT FEATURES

TECHNICAL FIELD

The present invention relates to an apparatus and a method for information processing, a program storing medium, a recording medium, and a program, and particularly to an apparatus and a method for information processing, a program storing medium, a recording medium, and a program that make it possible to quickly reproduce address information of a reproduction path recorded on a recording medium.

BACKGROUND ART

The following method has been previously known as a method for quickly performing determination of a reading position in an AV stream and decoding processing and quickly retrieving a specified mark in reproducing a recording medium on which a plurality of pieces of data including video data, audio data, and the like are recorded (see Japanese Patent Laid-Open No. 2002-158971, for example).

According to the method, a stream of an entity of contents is managed by Clip Information and reproduction of the AV stream is managed by a PlayList. As attribute information of the AV stream, address information RSPN_arrival_time_discontinuity on discontinuity points in the AV stream, information EP_map or TU_map for associating time information with address information in the AV stream, and time information ClipMark on a characteristic image in the AV stream are recorded in the Clip Information.

There is DVD (Digital Versatile Disc) video, in particular, as the above-mentioned recording medium on which a plurality of pieces of data including video data, audio data, and the like are recorded. A format of the DVD video defines multiangle reproduction. In a predetermined reproducing section allowing multiangle reproduction, a user can select an angle that suits preference of the user. At this time, change between angles can be performed seamlessly by a recording and reproducing apparatus.

FIG. 1 is a diagram of assistance in explaining a multiangle format of a DVD video.

A multiangle reproducing section includes a plurality of reproducing sections. One of the reproducing sections is referred to as a Cell. In the example of FIG. 1, the multiangle reproducing section includes Cell#i+1 to Cell#i+3 of three angles, that is, an angle 1 (Angle#1) to an angle 3 (Angle#3). AV stream data of an entity corresponding to Cells is referred to as a VOB (Video Object). A VOB corresponding to each Cell for forming a multiangle is divided into units referred to as ILVUs (Interleaved Units) not shown in the figure. The plurality of VOBs including the multiangle are multiplexed in ILVU units. Incidentally, each ILVU starts with a Closed GOP (Group of Pictures).

Description will be made of seamless angle change reproduction in a multiangle of a DVD video. When a user changes a reproduction path from the angle 2 to the angle 1 and then to the angle 3, for example, the recording and reproducing apparatus sequentially reads and reproduces data of an ILVU 1, an ILVU 2, and an ILVU 3 (none of them are shown) while jumping on the disk. Incidentally, each ILVU starts with DSI (Data Search Information), and the DSI has an address of a next ILVU of each angle to which to jump.

However, since DSI is embedded in an AV stream referred to as VOB, it is difficult to obtain information on an address where each piece of angle data to be reproduced next is stored, unless the AV stream is read. Hence, it takes time to read in advance all information on addresses where pieces of angle data to be reproduced in the future are stored, because all AV streams need to be read.

DISCLOSURE OF INVENTION

The present invention has been made of such a situation, and it is an object of the present invention to enable information on addresses where pieces of angle data are stored to be obtained quickly.

According to the present invention, there is provided a first information processing apparatus characterized by including: encoding means for generating each of AV streams forming a plurality of reproduction paths; managing information generating means for generating managing information including map information indicating positions of entry points of each of the AV streams and reproduction managing information indicating reproduction path change points set on the basis of the entry points included in the map information; and recording means for recording the AV streams and the managing information onto a recording medium.

The managing information generating means can generate a correspondence table describing correspondences between packet numbers and presentation time stamps of the entry points as the map information.

The encoding means can generate the AV streams one for each of the reproduction paths, and the managing information generating means can generate the map information and the reproduction managing information regarding all the AV streams generated one for each of the reproduction paths as one correspondence table.

The managing information generating means can generate the map information and the reproduction managing information regarding the AV streams generated one for each of the reproduction paths separately for each of the reproduction paths.

The managing information generated by the managing information generating means can include information for specifying each of the AV streams generated one for each of the reproduction paths and information for specifying a section where a plurality of the reproduction paths are present.

The encoding means can perform encoding such that a video stream of each section starting at the reproduction path change point is a Closed GOP starting with an I-picture and a first packet is a video packet, and the AV streams generated by the encoding means can be included in a transport stream.

The encoding means can set an identical value as a video packet ID of the transport stream and an identical value as an audio packet ID of the transport stream in all the reproduction paths.

The information processing apparatus can further include source-packetizing means for source-packetizing the transport stream of each section, and the recording means can record the transport stream of each section source-packetized by the source-packetizing means as an AV stream file on the recording medium.

When recording the AV streams on the recording medium, the recording means can record the AV streams after interleaving the AV streams such that the sections of the reproduction paths are in predetermined order.

When recording the AV streams on the recording medium, the recording means can record the AV streams such that a plurality of sections of an identical reproduction path are continuous with each other.

The reproduction managing information can include change information indicating whether reproduction paths can be changed at the entry points.

According to the present invention, there is provided a second information processing method characterized by including: an encoding step of generating each of AV streams forming a plurality of reproduction paths; a managing information generating step of generating managing information including map information indicating positions of entry points of each of the AV streams and reproduction managing information indicating reproduction path change points set on the basis of the entry points included in the map information; and a recording step of recording the AV streams and the managing information onto a recording medium.

According to the present invention, there is provided a program recorded on a first program storing medium, the program making a computer perform processing characterized by including: an encoding step of generating each of AV streams forming a plurality of reproduction paths; a managing information generating step of generating managing information including map information indicating positions of entry points of each of the AV streams and reproduction managing information indicating reproduction path change points set on the basis of the entry points included in the map information; and a recording step of recording the AV streams and the managing information onto a recording medium.

According to the present invention, there is provided a first program characterized by making a computer perform processing including: an encoding step of generating each of AV streams forming a plurality of reproduction paths; a managing information generating step of generating managing information including map information indicating positions of entry points of each of the AV streams and reproduction managing information indicating reproduction path change points set on the basis of the entry points included in the map information; and a recording step of recording the AV streams and the managing information onto a recording medium.

According to the present invention, there is provided a second information processing apparatus characterized by including: reading means for reading reproduction managing information given to each reproduction path having each section divided by a reproduction path change point of an AV stream as a unit, and reading map information including a correspondence table describing a correspondence between a packet number and a presentation time stamp of the change point of the AV stream; reproducing means for reproducing the AV streams recorded on a recording medium on the basis of the reproduction managing information read by the reading means; retrieving means for, when an instruction to make a reproduction path change is given, retrieving the reproduction managing information of a reproduction path from which to make the reproduction path change and the reproduction managing information of a reproduction path to which to make the reproduction path change; first obtaining means for obtaining a reproduction end position of the AV stream of the reproduction path from which to make the reproduction path change on the basis of the reproduction managing information of the reproduction path from which to make the reproduction path change and the correspondence table of the reproduction path from which to make the reproduction path change; second obtaining means for obtaining a reproduction start position of the AV stream of the reproduction path to which to make the reproduction path change on the basis of the reproduction managing information of the reproduction path to which to make the reproduction path change and the correspondence table of the reproduction path to which to make the reproduction path change; and control means for controlling the reproducing means to move a reproducing point at the reproduction end position to the reproduction start position.

According to the present invention, there is provided a second information processing method characterized by including: a reading step of reading reproduction managing information given to each reproduction path having each section divided by a reproduction path change point of an AV stream as a unit, and reading map information including a correspondence table describing a correspondence between a packet number and a presentation time stamp of the change point of the AV stream; a reproducing step of reproducing the AV streams recorded on a recording medium on the basis of the reproduction managing information read by processing of the reading step; a retrieving step of, when an instruction to make a reproduction path change is given, retrieving the reproduction managing information of a reproduction path from which to make the reproduction path change and the reproduction managing information of a reproduction path to which to make the reproduction path change; a first obtaining step of obtaining a reproduction end position of the AV stream of the reproduction path from which to make the reproduction path change on the basis of the reproduction managing information of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the reproduction managing information of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a program recorded on a second program storing medium, the program making a computer perform processing characterized by including: a reading step of reading reproduction managing information given to each reproduction path having each section divided by a reproduction path change point of an AV stream as a unit, and reading map information including a correspondence table describing a correspondence between a packet number and a presentation time stamp of the change point of the AV stream; a reproducing step of reproducing the AV streams recorded on a recording medium on the basis of the reproduction managing information read by processing of the reading step; a retrieving step of, when an instruction to make a reproduction path change is given, retrieving the reproduction managing information of a reproduction path from which to make the reproduction path change and the reproduction managing information of a reproduction path to which to make the reproduction path change; a first obtaining step of obtaining a reproduction end position of the AV stream of the reproduction path from which to make the reproduction path change on the basis of the reproduction managing information of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the reproduction managing information of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a second program characterized by making a computer perform: a reading step of reading reproduction managing information given to each reproduction path having each section divided by a reproduction path change point of an AV stream as a unit, and reading map information including a correspondence table describing a correspondence between a packet number and a presentation time stamp of the change point of the AV stream; a reproducing step of reproducing the AV streams recorded on a recording medium on the basis of the reproduction managing information read by processing of the reading step; a retrieving step of, when an instruction to make a reproduction path change is given, retrieving the reproduction managing information of a reproduction path from which to make the reproduction path change and the reproduction managing information of a reproduction path to which to make the reproduction path change; a first obtaining step of obtaining a reproduction end position of the AV stream of the reproduction path from which to make the reproduction path change on the basis of the reproduction managing information of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the reproduction managing information of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a third information processing apparatus characterized by including: encoding means for generating each of AV streams forming a plurality of reproduction paths; managing information generating means for generating managing information including map information indicating a start point of the AV stream of each reproduction path and positions of entry points of the AV stream, and reproduction managing information including the start point and an end point of the AV stream, reproduction path change points included in the entry points included in the map information, and specifying information for specifying the AV stream of each reproduction path; and recording means for recording the AV streams and the managing information onto a recording medium.

The managing information generating means can generate a correspondence table describing correspondences between packet numbers and presentation time stamps of the entry points as the map information.

The encoding means can generate the AV streams one for each of the reproduction paths, and the managing information generating means can generate the map information and the reproduction managing information regarding all the AV streams generated one for each of the reproduction paths as one correspondence table.

The managing information generating means can generate the map information and the reproduction managing information regarding the AV streams generated one for each of the reproduction paths separately for each of the reproduction paths.

The managing information generated by the managing information generating means can include information for specifying each of the AV streams generated one for each of the reproduction paths and information for specifying a section where a plurality of the reproduction paths are present.

The encoding means can perform encoding such that a video stream of each section starting at a reproduction path change point is a Closed GOP starting with an I-picture and a first packet is a video packet, and the AV streams generated by the encoding means can be included in a transport stream.

The encoding means can perform encoding such that a start of the video stream of each section is the Closed GOP and a subsequent part of the video stream of each section is a non-Closed GOP.

The information processing apparatus can further include source-packetizing means for source-packetizing the transport stream of each section, and the recording means can record the transport stream of each section source-packetized by the source-packetizing means as an AV stream file onto the recording medium.

The managing information generating means can generate one correspondence table to be included in the map information, the correspondence table corresponding to the AV stream file.

When recording the AV streams on the recording medium, the recording means can record the AV streams after interleaving the AV streams such that the sections of the reproduction paths are in predetermined order.

When recording the AV streams on the recording medium, the recording means can record the AV streams such that a plurality of sections of an identical reproduction path are continuous with each other.

The reproduction managing information can include change information indicating whether reproduction paths can be changed at the entry points.

According to the present invention, there is provided a third information processing method characterized by including: an encoding step of generating each of AV streams forming a plurality of reproduction paths; a managing information generating step of generating managing information including map information indicating a start point of the AV stream of each reproduction path and positions of entry points of the AV stream and reproduction managing information including the start point and an end point of the AV stream, reproduction path change points included in the entry points included in the map information, and specifying information for specifying the AV stream of each reproduction path; and a recording step of recording the AV streams and the managing information onto a recording medium.

According to the present invention, there is provided a program recorded on a third program storing medium, the program making a computer perform processing characterized by including: an encoding step of generating each of AV streams forming a plurality of reproduction paths; a managing information generating step of generating managing information including map information indicating a start point of the AV stream of each reproduction path and positions of entry points of the AV stream and reproduction managing information including the start point and an end point of the AV stream, reproduction path change points included in the entry points included in the map information, and specifying information for specifying the AV stream of each reproduction path; and a recording step of recording the AV streams and the managing information onto a recording medium.

According to the present invention, there is provided a third program characterized by making a computer perform: an encoding step of generating each of AV streams forming a plurality of reproduction paths; a managing information generating step of generating managing information including map information indicating a start point of the AV stream of each reproduction path and positions of entry points of the AV stream and reproduction managing information including the start point and an end point of the AV stream, reproduction path change points included in the entry points included in the map information, and specifying information for specifying the AV stream of each reproduction path; and a recording step of recording the AV streams and the managing information onto a recording medium.

According to the present invention, there is provided a fourth information processing apparatus characterized by including: reading means for reading reproduction managing information including a reproduction path change point of AV streams, a start point and an end point of the AV streams, and specifying information for specifying the AV stream of each reproduction path, and reading map information including a correspondence table describing correspondences between packet numbers and presentation time stamps of the start point and the change point of the AV streams; reproducing means for reproducing the AV streams recorded on a recording medium on the basis of the reproduction managing information read by the reading means; retrieving means for, when an instruction to make a reproduction path change is given, retrieving a section of a reproduction path from which to make the reproduction path change and a section of a reproduction path to which to make the reproduction path change; first obtaining means for obtaining a reproduction end position of the AV stream of the reproduction path from which to make the reproduction path change on the basis of the section of the reproduction path from which to make the reproduction path change and the correspondence table of the reproduction path from which to make the reproduction path change; second obtaining means for obtaining a reproduction start position of the AV stream of the reproduction path to which to make the reproduction path change on the basis of the section of the reproduction path to which to make the reproduction path change and the correspondence table of the reproduction path to which to make the reproduction path change; and control means for controlling the reproducing means to move a reproducing point at the reproduction end position to the reproduction start position.

According to the present invention, there is provided a fourth information processing method characterized by including: a reading step of reading reproduction managing information including a reproduction path change point of AV streams, a start point and an end point of the AV streams, and specifying information for specifying the AV stream of each reproduction path, and reading map information including a correspondence table describing correspondences between packet numbers and presentation time stamps of the start point and the change point of the AV streams; a reproducing step of reproducing the AV streams recorded on a recording medium on the basis of the reproduction managing information read by processing of the reading step; a retrieving step of, when an instruction to make a reproduction path change is given, retrieving a section of a reproduction path from which to make the reproduction path change and a section of a reproduction path to which to make the reproduction path change; a first obtaining step of obtaining a reproduction end position of the AV stream of the reproduction path from which to make the reproduction path change on the basis of the section of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the section of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a program recorded on a fourth program storing medium, the program making a computer perform processing characterized by including: a reading step of reading reproduction managing information including a reproduction path change point of AV streams, a start point and an end point of the AV streams, and specifying information for specifying the AV stream of each reproduction path, and reading map information including a correspondence table describing correspondences between packet numbers and presentation time stamps of the start point and the change point of the AV streams; a reproducing step of reproducing the AV streams recorded on a recording medium on the basis of the reproduction managing information read by processing of the reading step; a retrieving step of, when an instruction to make a reproduction path change is given, retrieving a section of a reproduction path from which to make the reproduction path change and a section of a reproduction path to which to make the reproduction path change; a first obtaining step of obtaining a reproduction end position of the AV stream of the reproduction path from which to make the reproduction path change on the basis of the section of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the section of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a fourth program characterized by making a computer perform: a reading step of reading reproduction managing information including a reproduction path change point of AV streams, a start point and an end point of the AV streams, and specifying information for specifying the AV stream of each reproduction path, and reading map information including a correspondence table describing correspondences between packet numbers and presentation time stamps of the start point and the change point of the AV streams; a reproducing step of reproducing the AV streams recorded on a recording medium on the basis of the reproduction managing information read by processing of the reading step; a retrieving step of, when an instruction to make a reproduction path change is given, retrieving a section of a reproduction path from which to make the reproduction path change and a section of a reproduction path to which to make the reproduction path change; a first obtaining step of obtaining a reproduction end position of the AV stream of the reproduction path from which to make the reproduction path change on the basis of the section of the reproduction path from which to make the reproduction path change and the correspondence table of the reproduction path from which to make the reproduction path change; a second obtaining step of obtaining a reproduction start position of the AV stream of the reproduction path to which to make the reproduction path change on the basis of the section of the reproduction path to which to make the reproduction path change and the correspondence table of the reproduction path to which to make the reproduction path change; and a control step of controlling processing of the reproducing step to move a reproducing point at the reproduction end position to the reproduction start position.

According to the present invention, there is provided a first recording medium characterized in that data is recorded having a structure wherein reproduction managing information includes information on a reproduction path change point of AV streams and a start point and an end point of the AV streams, and map information includes a correspondence table describing correspondences between packet numbers and presentation time stamps of the start point and the change point of the AV streams.

According to the present invention, there is provided a second recording medium characterized in that data is recorded having a structure wherein reproduction managing information includes a reproduction path change point of AV streams, a start point and an end point of the AV streams, and specifying information for specifying the AV stream of each reproduction path, and map information includes a correspondence table describing correspondences between packet numbers and presentation time stamps of the start point and the change point of the AV streams.

Each of AV streams forming a plurality of reproduction paths are generated, managing information including map information indicating positions of entry points of each of the AV streams and reproduction managing information indicating reproduction path change points set on the basis of the entry points included in the map information is generated, and the AV streams and the managing information are recorded onto a recording medium.

Reproduction managing information given to each reproduction path having each section divided by a reproduction path change point of an AV stream as a unit is read and map information including a correspondence table describing a correspondence between a packet number and a presentation time stamp of the change point of the AV stream is read, the AV stream recorded on a recording medium is reproduced on the basis of the read reproduction managing information, when an instruction to make a reproduction path change is given, the reproduction managing information of a reproduction path from which to make the reproduction path change and the reproduction managing information of a reproduction path to which to make the reproduction path change are retrieved, a reproduction end position of the AV stream of the reproduction path from which to make the reproduction path change is obtained on the basis of the reproduction managing information of the reproduction path from which to make the reproduction path change and the correspondence table of the reproduction path from which to make the reproduction path change, a reproduction start position of the AV stream of the reproduction path to which to make the reproduction path change is obtained on the basis of the reproduction managing information of the path and the correspondence table of the reproduction path to which to make the reproduction path change, and the reproduction is controlled to move a reproducing point at the reproduction end position to the reproduction start position.

Each of AV streams forming a plurality of reproduction paths is generated, managing information including map information indicating a start point of the AV stream of each reproduction path and positions of entry points of the AV stream and reproduction managing information including the start point and an end point of the AV stream, reproduction path change points included in the entry points included in the map information, and specifying information for specifying the AV stream of each reproduction path is generated, and the AV streams and the managing information are recorded onto a recording medium.

Reproduction managing information including a reproduction path change point of AV streams, a start point and an end point of the AV streams, and specifying information for specifying the AV stream of each reproduction path is read and map information including a correspondence table describing correspondences between packet numbers and presentation time stamps of the start point and the change point of the AV streams is read, the AV stream recorded on a recording medium is reproduced on the basis of the read reproduction managing information, when an instruction to make a reproduction path change is given, a section of a reproduction path from which to make the reproduction path change and a section of a reproduction path to which to make the reproduction path change are retrieved, a reproduction end position of the AV stream of the reproduction path from which to make the reproduction path change is obtained on the basis of the section of the reproduction path from which to make the reproduction path change and the correspondence table of the reproduction path from which to make the reproduction path change, a reproduction start position of the AV stream of the reproduction path to which to make the reproduction path change is obtained on the basis of the section of the reproduction path to which to make the reproduction path change and the correspondence table of the reproduction path to which to make the reproduction path change, and the reproduction is controlled to move a reproducing point at the reproduction end position to the reproduction start position.

Data is recorded having a structure wherein reproduction managing information includes information on a reproduction path change point of AV streams and a start point and an end point of the AV streams, and entity managing information includes a correspondence table describing correspondences between packet numbers and presentation time stamps of the start point and the change point of the AV streams.

Data is recorded having a structure wherein reproduction managing information includes a reproduction path change point of AV streams, a start point and an end point of the AV streams, and specifying information for specifying the AV stream of each reproduction path, and entity managing information includes a correspondence table describing correspondences between packet numbers and presentation time stamps of the start point and the change point of the AV streams.

BRIEF DESCRIPTION OF DRAWINGS

FIG. 16 is a diagram showing a syntax of a PlayItem in FIG. 15;

FIG. 22 is a flowchart of assistance in explaining processing for determining data reading addresses using an EP_map in FIG. 20;

FIG. 24 is a diagram showing a syntax of a PlayItem in FIG. 23;

FIG. 25 is a flowchart of assistance in explaining reproduction processing 2.

BEST MODE FOR CARRYING OUT THE INVENTION

Preferred embodiments of the present invention will hereinafter be described with reference to the drawings.

Figure 1:
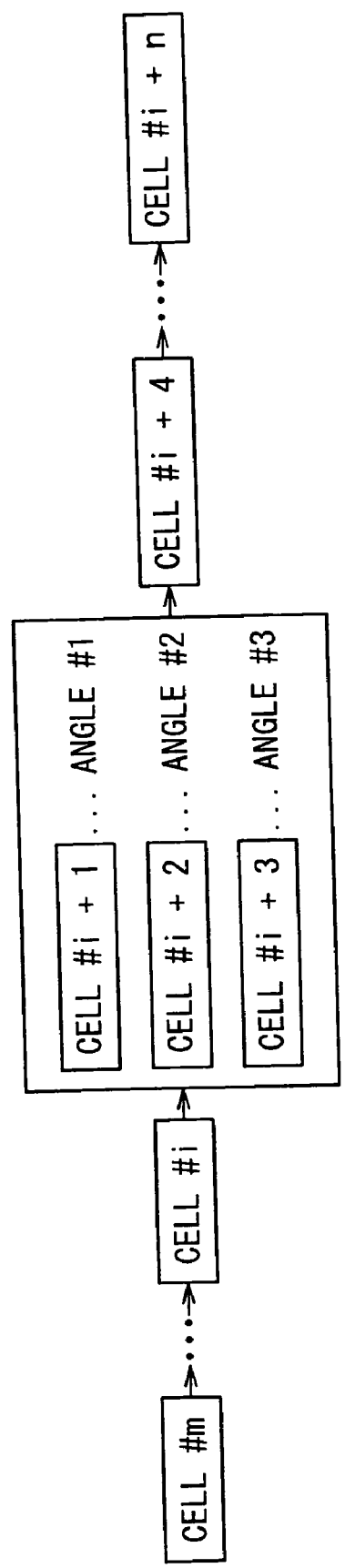
FIG. 1 is a diagram of assistance in explaining a multiangle format of a DVD video.
Figure 2:
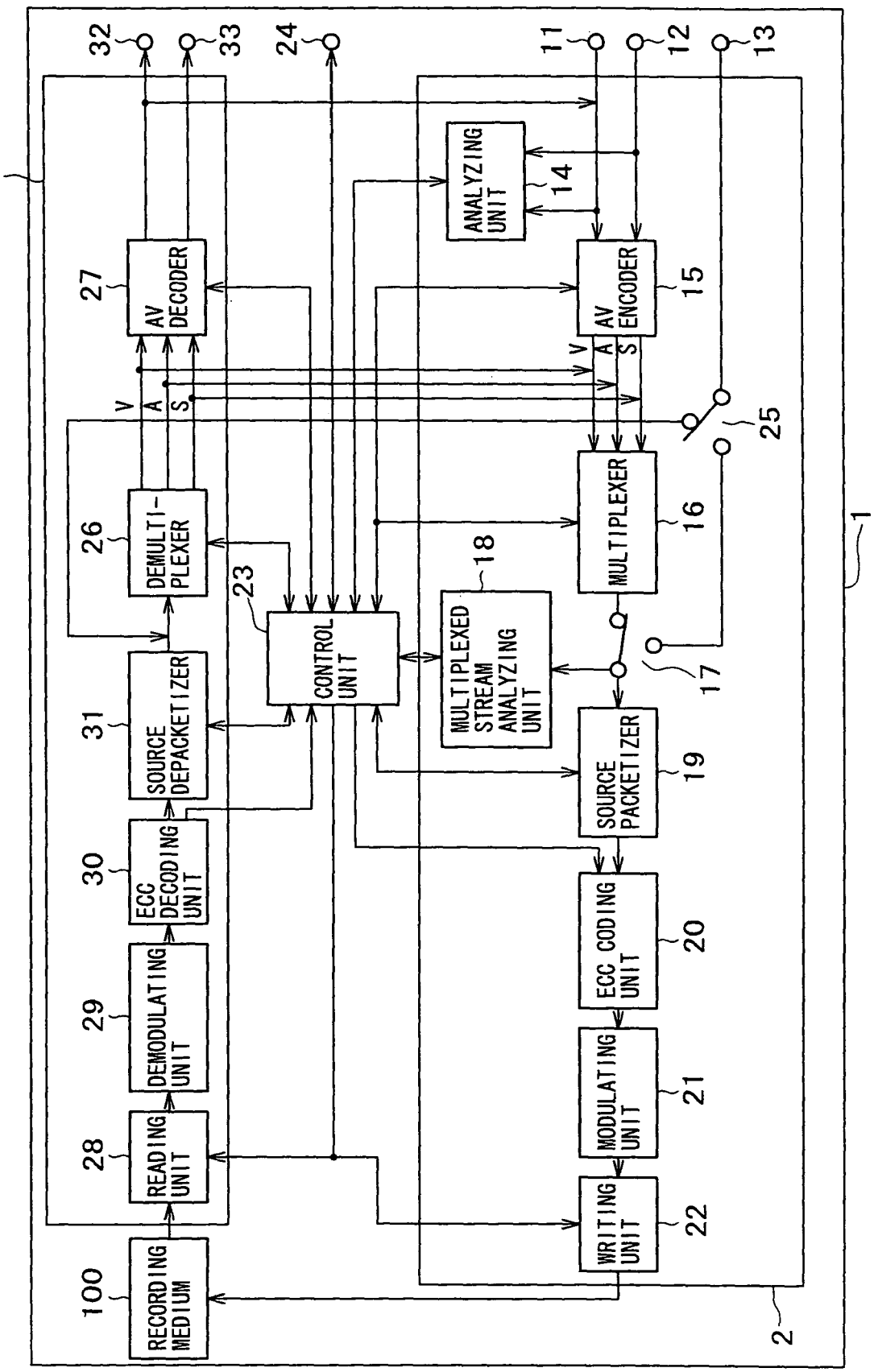
FIG. 2 is a block diagram showing an internal configuration of a recording and reproducing apparatus to which the present invention is applied.

FIG. 2 shows an internal configuration of a recording and reproducing apparatus 1 to which the present invention is applied.

Description will first be made of a configuration of a recording unit 2 for performing operation of recording an externally inputted signal onto a recording medium. The recording and reproducing apparatus 1 is configured to be able to receive and record analog data or digital data.

An analog video signal is inputted to a terminal 11, and an analog audio signal is inputted to a terminal 12. The video signal inputted to the terminal 11 is outputted to an analyzing unit 14 and an AV encoder 15. The audio signal inputted to the terminal 12 is outputted to the analyzing unit 14 and the AV encoder 15. The analyzing unit 14 extracts scene change points and other characteristic points from the video signal and the audio signal inputted to the analyzing unit 14.

The AV encoder 15 encodes the video signal and the audio signal inputted to the AV encoder 15. The AV encoder 15 outputs an encoded video stream (V), an encoded audio stream (A), and system information (S) for AV synchronization and the like to a multiplexer 16.

The encoded video stream is a video stream encoded by an MPEG (Moving Picture Expert Group) 2 system, for example. The encoded audio stream is for example an audio stream encoded by an MPEG1 system, an audio stream encoded by a Dolby AC3 system (trademark), or the like. The multiplexer 16 multiplexes the video and audio streams input to the multiplexer 16 on the basis of the input system information, and then outputs the multiplexed stream to a multiplexed stream analyzing unit 18 and a source packetizer 19 via a switch 17.

The multiplexed stream is for example an MPEG2 transport stream or an MPEG2 program stream. The source packetizer 19 encodes the multiplexed stream inputted to the source packetizer 19 into an AV stream including source packets according to an application format of a recording medium 100 for recording the stream. The AV stream is subjected to ECC (error correction) code addition and modulation processing by an ECC coding unit 20 and a modulating unit 21. The AV stream is then outputted to a writing unit 22. The writing unit 22 writes (records) the AV stream file to the recording medium (disk) 100 formed by a DVD, for example, on the basis of a control signal outputted from a control unit 23.

A transport stream of a digital television broadcast or the like inputted from a digital interface or a digital television tuner (neither is shown) is inputted to a terminal 13. There are two methods of recording the transport stream inputted to the terminal 13: a method of recording the transport stream transparently and a method of recording the transport stream after re-encoding the transport stream for purposes of lowering a recording bit rate and the like. Information for specifying the recording method is inputted from a terminal 24 as a user interface to the control unit 23.

When the input transport stream is to be recorded transparently, the transport stream inputted to the terminal 13 is outputted to the multiplexed stream analyzing unit 18 and the source packetizer 19 via the switch 17. Subsequent processing until the AV stream is recorded onto the recording medium 100 is the same as in the above case of encoding and recording the input analog audio and video signals, and therefore description of the subsequent processing will be omitted.

When the input transport stream is to be re-encoded and then recorded, the transport stream inputted to the terminal 13 is inputted from a switch 25 to a demultiplexer 26. The demultiplexer 26 subjects the transport stream inputted thereto to demultiplex processing, and thereby extracts a video stream (V), an audio stream (A), and system information (S).

Of the streams (information) extracted by the demultiplexer 26, the video stream is outputted to an AV decoder 27, and the audio stream and the system information are outputted to the multiplexer 16. The AV decoder 27 decodes the video stream inputted thereto, and then outputs a resulting reproduced video signal to the AV encoder 15. The AV encoder 15 encodes the input video signal, and then outputs an encoded video stream (V) to the multiplexer 16.

The audio stream and the system information outputted from the demultiplexer 26 and inputted to the multiplexer 16 and the video stream outputted from the AV encoder 15 are multiplexed on the basis of the input system information, and then outputted as a multiplexed stream to the multiplexed stream analyzing unit 18 and the source packetizer 19 via the switch 17. Subsequent processing until the AV stream is recorded onto the recording medium 100 is the same as in the above case of encoding and recording the input analog audio and video signals, and therefore description of the subsequent processing will be omitted.

The recording and reproducing apparatus 1 according to the present embodiment records an AV stream file onto the recording medium 100 and also records application database information used for reproduction of the file and the like. The application database information is created by the control unit 23. Information inputted to the control unit 23 is moving image characteristic information from the analyzing unit 14, AV stream characteristic information from the multiplexed stream analyzing unit 18, and user instruction information inputted from the terminal 24.

The moving image characteristic information supplied from the analyzing unit 14 is generated by the analyzing unit 14 when the AV encoder 15 encodes a video signal. The analyzing unit 14 analyzes contents of the input video signal and audio signal, and generates information related to characteristic images in the input moving image signal. For example, the information is specifying information that specifies a start point of a program in the input video signal, a scene change point, a start point and an end point of a commercial or the like, and a characteristic image such as an image including a title or a telop or the like. In this case, such specifying information will be referred to as a clip mark. The clip mark may also include a thumbnail of the image. The clip mark further includes information on a point of change between a stereo audio signal and a monophonic audio signal, a section without sound, or the like.

These pieces of image specifying information are inputted to the multiplexer 16 via the control unit 23. When multiplexing an encoded picture from the control unit 23 which picture is specified as a clip mark, the multiplexer 16 returns information for identifying the encoded picture on the AV stream to the control unit 23. This information is specifically a PTS (Presentation Time Stamp) of the picture or address information of the encoded picture on the AV stream. The control unit 23 stores a type of the characteristic image and the information for identifying the encoded picture on the AV stream in association with each other.

The AV stream characteristic information from the multiplexed stream analyzing unit 18 relates to information on encoding of an AV stream to be recorded, and is generated by the multiplexed stream analyzing unit 18. For example, the AV stream characteristic information includes a time stamp and address information of an I-picture within the AV stream, information on a discontinuity of a system time clock, encoding parameters of the AV stream, information on a point of change of the encoding parameters in the AV stream, and the like. When the transport stream inputted from the terminal 13 is to be recorded transparently, the multiplexed stream analyzing unit 18 detects a picture having a characteristic as described above from the input transport stream, and generates information for identifying a type of the picture and the picture specified by a clip mark.

The user instruction information inputted from the terminal 24 includes information specifying a reproducing section specified by the user in the AV stream, characters describing contents in the reproducing section, information on a resume point or a bookmark set at a desired scene by the user, and the like.

On the basis of the above input information, the control unit 23 creates an AV stream database (Clip Information), a database of PlayLists formed by grouping reproducing sections (PlayItems) in the AV stream, information (info.dvr) for managing contents recorded on the recording medium 100, and thumbnail information. As with an AV stream, the application database information including these pieces of information is processed by the ECC encoding unit 20 and the modulating unit 21, and then inputted to the writing unit 22. The writing unit 22 records a database file onto the recording medium 100 on the basis of a control signal outputted from the control unit 23.

Details of the above-mentioned application database information will be described later.

When the AV stream file (a file of video data and audio data) and the application database information thus recorded on the recording medium 100 are to be reproduced by a reproducing unit 3, the control unit 23 first instructs a reading unit 28 to read the application database information from the recording medium 100. The reading unit 28 reads the application database information from the recording medium 100. The application database information is subjected to demodulation and error correction processing by a demodulating unit 29 and an ECC decoding unit 30, and then inputted to the control unit 23.

On the basis of the application database information, the control unit 23 outputs a list of PlayLists recorded on the recording medium 100 to the user interface of the terminal 24. The user selects a PlayList desired to be reproduced from the list of the PlayLists, and thereby information on the PlayList specified for reproduction is inputted from the terminal 24 to the control unit 23. The control unit 23 instructs the reading unit 28 to read an AV stream file necessary for the reproduction of that PlayList. The reading unit 28 reads a corresponding AV stream from the recording medium 100 according to the instruction, and outputs the AV stream to the demodulating unit 29. The AV stream inputted to the demodulating unit 29 is demodulated by being subjected to predetermined processing, then processed by the ECC decoding unit 30, and outputted to a source depacketizer 31.

The source depacketizer 31 converts the AV stream in an application format after being read from the recording medium 100 and subjected to the predetermined processing into a stream that can be processed by the demultiplexer 26. The demultiplexer 26 outputs, to the AV decoder 27, a video stream (V), an audio stream (A), and system information (S) for AV synchronization and the like, which include a reproducing section (PlayItem) of the AV stream specified by the control unit 23. The AV decoder 27 decodes the video stream and the audio stream, and then outputs a reproduced video signal and a reproduced audio signal from a terminal 32 and a terminal 33 corresponding to the reproduced video signal and the reproduced audio signal, respectively.

When information indicating random access reproduction or special reproduction is inputted from the terminal 24 as the user interface, the control unit 23 determines a position to read an AV stream from the recording medium 100 on the basis of contents of the AV stream database (Clip Information), and then instructs the reading unit 28 to read the AV stream. When a PlayList selected by the user is reproduced from a predetermined time, for example, the control unit 23 instructs the reading unit 28 to read data from an I-picture having a time stamp closest to the specified time.

When the user selects a clip mark from program start points or scene change points stored in clip marks (ClipMarks) in Clip Information recorded attached to an AV stream (Clip) as an AV stream database forming application database information (for example, this operation is performed when a thumbnail picture list of the program start points or the scene change points stored in the ClipMarks is displayed on the user interface and the user selects a picture from the thumbnail picture list), the control unit 23 determines a position to read the AV stream from the recording medium 100 on the basis of contents of the Clip Information, and then instructs the reading unit 28 to read the AV stream. Specifically, the control unit 23 instructs the reading unit 28 to read data from an I-picture at an address closest to an address on the AV stream at which address of the picture selected by the user is stored. The reading unit 28 reads data from the specified address. The read data is subjected to processing by the demodulating unit 29, the ECC decoding unit 30, and the source depacketizer 31, inputted to the demultiplexer 26, and then decoded by the AV decoder 27, whereby the AV data indicated by the address of the picture at the mark point is reproduced.

When an instruction for high-speed reproduction (fast-forward playback) is given by the user, the control unit 23 instructs the reading unit 28 to read I-picture data in the AV stream sequentially on the basis of the AV stream database (Clip Information).

The reading unit 28 reads AV stream data from random access points specified as a position where an I-picture is recorded. The read data is subjected to processing by the parts in the subsequent stage, and is thereby reproduced.

Description will be made of a case where the user edits an AV stream recorded on the recording medium 100. When the user desires to create a new reproduction path (new PlayList) by specifying reproducing sections in AV streams recorded on the recording medium 100, for example when the user desires to create a new reproduction path to reproduce a segment of a singer A from a song program A and then reproduce a segment of the singer A from a song program B continuously, information of start points (IN points) and end points (OUT points) of the reproducing sections is inputted from the terminal 24 as the user interface to the control unit 23. The control unit 23 creates a database of a group (PlayList) of the reproducing sections (PlayItems) of the AV streams.

When the user desires to erase a part of an AV stream recorded on the recording medium 100, information of an IN point and an OUT point of the section to be erased is inputted from the terminal 24 as the user interface to the control unit 23. The control unit 23 changes the PlayList database to refer to only necessary AV stream portions. In addition, the control unit 23 instructs the writing unit 22 to erase the unnecessary stream portion of the AV stream.

Description will be made of a case where the user desires to create a new reproduction path by specifying reproducing sections in AV streams recorded on the recording medium 100 and desires to connect the reproducing sections to each other seamlessly. In this case, the control unit 23 creates a database of a group (PlayList) of the reproducing sections (PlayItems) of the AV streams, and further performs partial re-encoding and re-multiplexing of video streams around a point of connection between the reproducing sections.

First, information on pictures at an IN point and an OUT point of the reproducing sections is inputted from the terminal 24 to the control unit 23. The control unit 23 instructs the reading unit 28 to read data required to reproduce the pictures on the IN point side and pictures on the OUT point side. The reading unit 28 reads the data from the recording medium 100. The data is passed through the demodulating unit 29, the ECC decoding unit 30, and the source depacketizer 31, and then outputted to the demultiplexer 26.

The control unit 23 analyzes the data inputted to the demultiplexer 26, and determines a re-encoding method (changing a picture_coding_type and assigning an amount of encoding bits for re-encoding) and a re-multiplexing method for the video stream. The control unit 23 then supplies the methods to the AV encoder 15 and the multiplexer 16.

Next, the demultiplexer 26 separates the input stream into a video stream (V), an audio stream (A), and system information (S). The video stream includes data inputted to the AV decoder 27 and data inputted to the multiplexer 16. The former data is required for re-encoding. The data is decoded by the AV decoder 27, and decoded pictures are re-encoded into a video stream by the AV encoder 15. The latter data is not re-encoded, and is copied from the original stream. The audio stream and the system information are inputted directly to the multiplexer 16.

The multiplexer 16 multiplexes the input streams on the basis of the information inputted from the control unit 23, and then outputs a multiplexed stream. The multiplexed stream is processed by the ECC coding unit 20 and the modulating unit 21, and then inputted to the writing unit 22. The writing unit 22 records the AV stream onto the recording medium 100 on the basis of a control signal supplied from the control unit 23.

Figure 3:
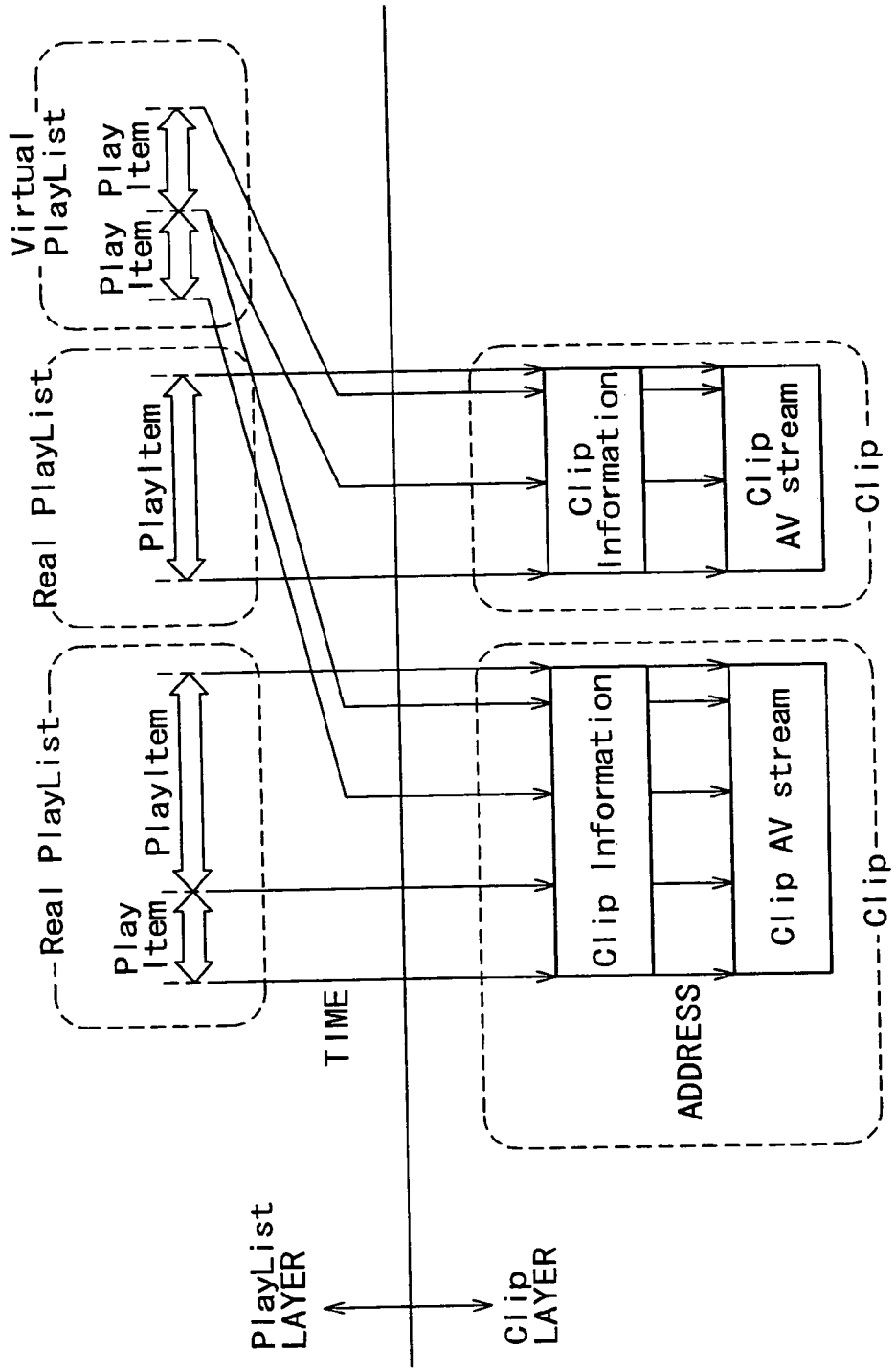
FIG. 3 is a diagram of assistance in explaining a structure of an application format on a recording medium used in an embodiment of the present invention.

Description will be made below of the application database information and operations such as reproduction, editing and the like based on the information. FIG. 3 schematically shows a structure of an application format on the recording medium 100 used in the embodiment of the present invention.

The application format has two layers, that is, a PlayList layer and a Clip layer to manage AV streams. Volume Information manages all Clips and PlayLists within the disk. In this case, a pair of one AV stream and information attached thereto is considered to be one object, and is referred to as a Clip. An AV stream file is referred to as a Clip AV stream file, and information attached thereto is referred to as a Clip Information file.

One Clip AV stream file stores data in which an MPEG2 transport stream is arranged in a structure defined by the application format. In general, a file is handled as a byte string, while contents of the Clip AV stream file are extended on a time base and an entry point (I-picture) in the Clip is specified mainly on the time base. When a time stamp of a point of access (including an entry point) to a predetermined Clip is given, the Clip Information file helps find information on an address at which to start data reading in the Clip AV stream file.

PlayLists will be described with reference to FIG. 3. PlayLists are provided to allow a user to select reproducing sections desired to be viewed by the user from Clips and easily edit the reproducing sections. One PlayList is a collection of reproducing sections in a Clip. One reproducing section in a given Clip is referred to as a PlayItem, which is represented by a pair of an IN point and an OUT point on the time base. Thus, the PlayList is formed by a collection of one or more PlayItems.

There are two types of PlayLists. One is Real PlayList, and the other is Virtual PlayList. A Real PlayList shares the stream portion of a Clip that the Real PlayList refers to. That is, the Real PlayList occupies a data space in the disk which space corresponds to the stream portion of the Clip that the Real PlayList refers to. When the Real PlayList is erased, data of the stream portion of the Clip that the Real PlayList refers to is also erased.

A Virtual PlayList does not share the data of a Clip. Even when a Virtual PlayList is changed or erased, no change occurs in contents of Clips.

Figure 4:
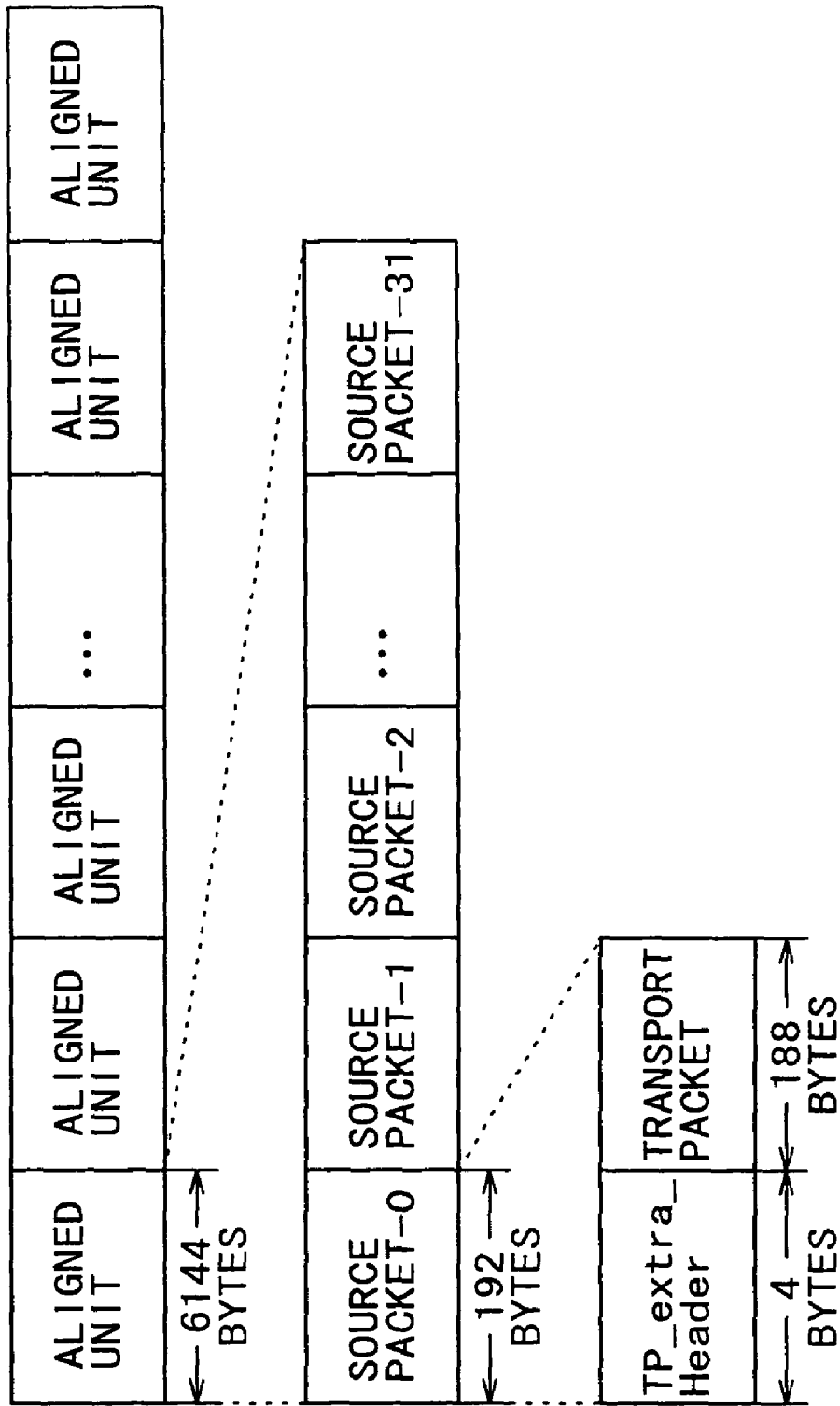
FIG. 4 is a diagram showing a structure of an AV stream file.

Description will be made of a DVR MPEG-2 transport stream. FIG. 4 shows a structure of an AV stream file.

The AV stream file has a structure of a DVR MPEG2 transport stream. The DVR MPEG2 transport stream includes an integral number of Aligned units. Size of an Aligned unit is 6144 bytes (2048×3 bytes). An Aligned unit is started with a first byte of a source packet. A source packet has a length of 192 bytes. One source packet includes a TP_extra_header and a transport packet. The TP_extra_header has a length of four bytes, and the transport packet has a length of 188 bytes.

One Aligned unit includes 32 source packets. The last Aligned unit in the DVR MPEG2 transport stream also includes 32 source packets. Thus, the DVR MPEG2 transport stream is terminated at a boundary of the Aligned unit. When the number of transport packets of the input transport stream to be recorded on the recording medium (disk) 100 is not a multiple of 32, source packets having a null packet (transport packet with PID=0x1FFF) are used in the last Aligned unit. The file system (control unit 23) does not add extra information (effective information) to the DVR MPEG2 transport stream.

Figure 5:
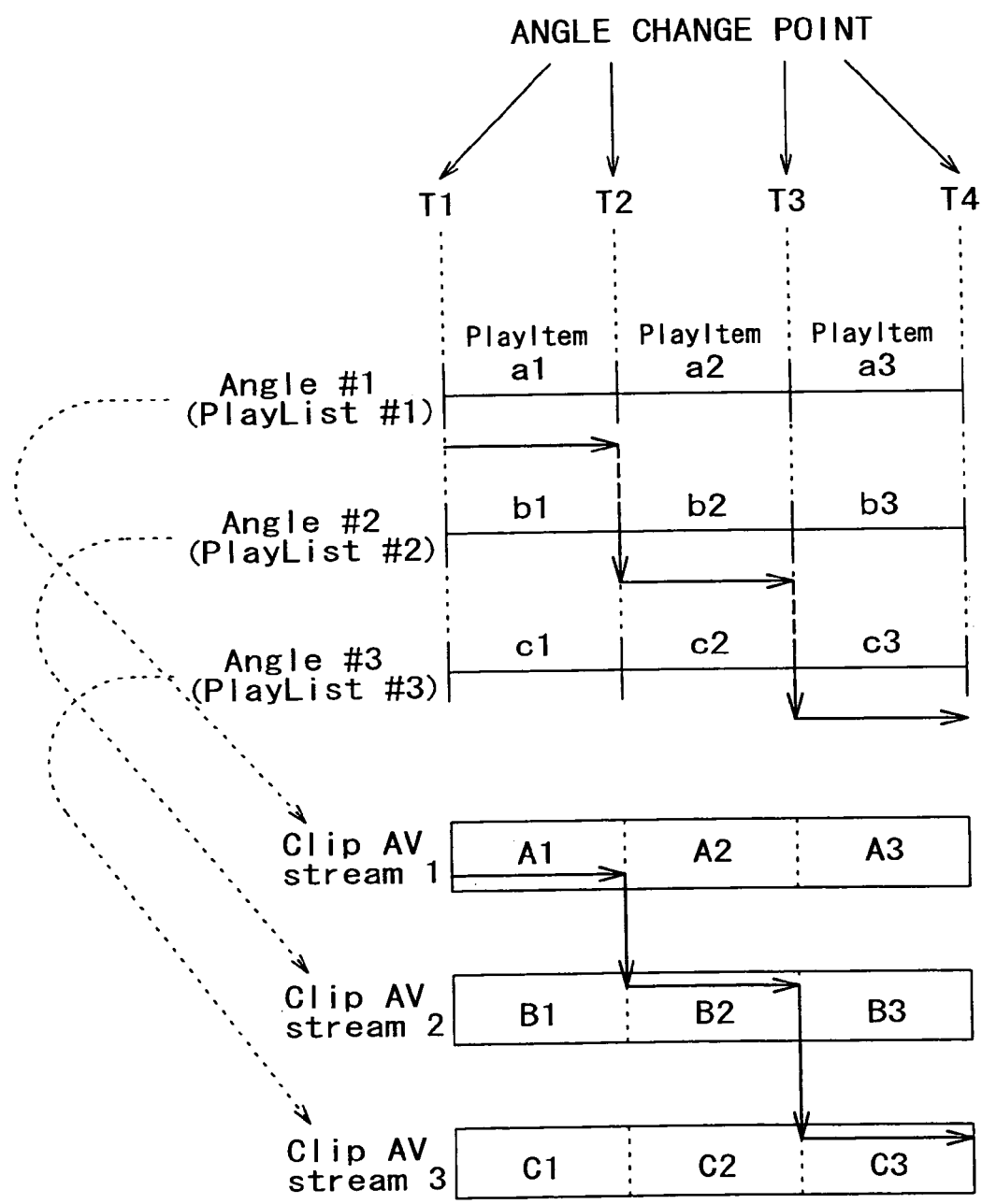
FIG. 5 is a diagram of assistance in explaining seamless angle change reproduction in a multiangle.

FIG. 5 shows a structure used in the present invention to enable multiangle reproduction to be performed seamlessly (without interruption of reproduced video or audio at a time of angle change) by changing angles.

Suppose that there are three angles Angle#1, Angle#2, and Angle#3 in a multiangle section. In this case, each angle forms one PlayList. In the example of FIG. 5, Angle#1, Angle#2, and Angle#3 are formed by PlayList#1, PlayList#2, and PlayList#3, respectively. Suppose that AV stream data corresponding to reproducing sections of Angle#1, Angle#2, and Angle#3 is Clip 1 (Clip AV stream 1), Clip 2 (Clip AV stream 2), and Clip 3 (Clip AV stream 3), respectively.

In the example of FIG. 5, the reproducing sections are divided into different PlayItems by positions of timing that allows a change from one angle to another angle (angle change points). When the reproducing section of Angle#1 is divided into three sections, for example, PlayList#1 includes three PlayItems corresponding to the reproducing sections a1, a2, and a3, and the AV stream data of Clip 1 corresponding to the reproducing sections a1, a2, and a3 is A1, A2, and A3, respectively. When the reproducing section of Angle#2 is divided into three sections, PlayList#2 includes three PlayItems corresponding to the reproducing sections b1, b2, and b3, and the AV stream data of Clip 2 corresponding to the reproducing sections b1, b2, and b3 is B1, B2, and B3, respectively. When the reproducing section of Angle#3 is divided into three sections, PlayList#3 includes three PlayItems corresponding to the reproducing sections c1, c2, and c3, and the AV stream data of Clip 3 corresponding to the reproducing sections c1, c2, and c3 is C1, C2, and C3, respectively.

The PlayItems of the reproducing sections a1, b1, and c1 have a set of the same IN point (IN_time) and the same OUT point (OUT_time). For example, the IN_time is T1, and the OUT_time is T2. Similarly, the PlayItems of the reproducing sections a2, b2, and c2 have a set of the same IN point (IN_time) and the same OUT point (OUT_time). For example, the IN_time is T2, and the OUT_time is T3. The PlayItems of the reproducing sections a3, b3, and c3 have a set of the same IN point (IN_time) and the same OUT point (OUT_time). For example, the IN_time is T3, and the OUT_time is T4. In this case, T1, T2, T3, and T4 each denote a PTS (Presentation Time Stamp) on the AV streams. Incidentally, T1, T2, T3, and T4 may be at equal intervals.

Figure 6:
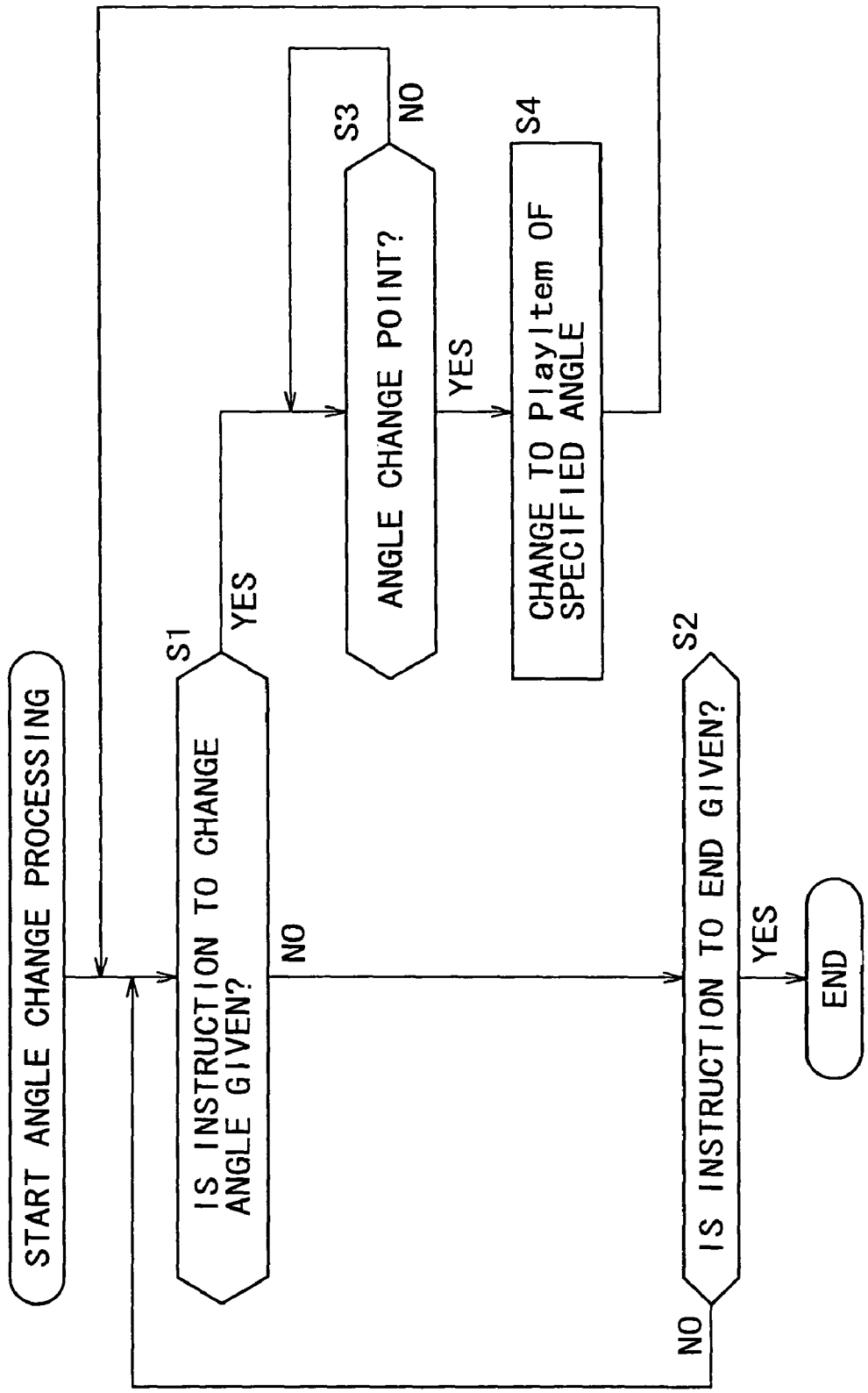
FIG. 6 is a flowchart of assistance in explaining processing in seamless angle change in a multiangle.

Basic processing in seamless angle change in a multiangle will be described with reference to a flowchart of FIG. 6.

In step S1, the control unit 23 determines whether an instruction to change an angle being reproduced now is given from the user. When the control unit 23 determines that no instruction to change the angle is given, the processing proceeds to step S2, where the control unit 23 determines whether an instruction to end the reproduction is given by the user. When the control unit 23 determines that an instruction to end the reproduction is given, the processing is ended.

When the control unit 23 determines in step S2 that no instruction to end the reproduction is given, the processing returns to step S1 to repeat the processing from step S1 on down. When the control unit 23 determines in step S1 that an instruction to change the angle is given, the control unit 23 determines in step S3 whether the reproducing position is an angle change point. When the current position is not an angle change point, the control unit 23 stands by until the reproducing position reaches an angle change point.

When the control unit 23 determines in step S3 that the reproducing position has reached an angle change point, the control unit 23 changes (jumps) the reproducing position to a start position of an AV stream specified by the PlayItem of the specified angle in step S4. Then, the data of the AV stream is reproduced. Thereafter the processing returns to step S1 to repeat the processing from step S1 on down.

Thus, in the example of FIG. 5, the AV stream data A1 of Clip AV stream 1 corresponding to the reproducing section of Angle#1 is reproduced, the AV stream data B2 of Clip AV stream 2 corresponding to the reproducing section of Angle#2 is reproduced, and then the AV stream data C3 of Clip AV stream 3 corresponding to the reproducing section of Angle#3 is reproduced sequentially.

Information of a start address and an end address and information of data size (byte quantity) of the PlayItems are obtained from a Clip Information file of the respective Clips.

Figure 7:
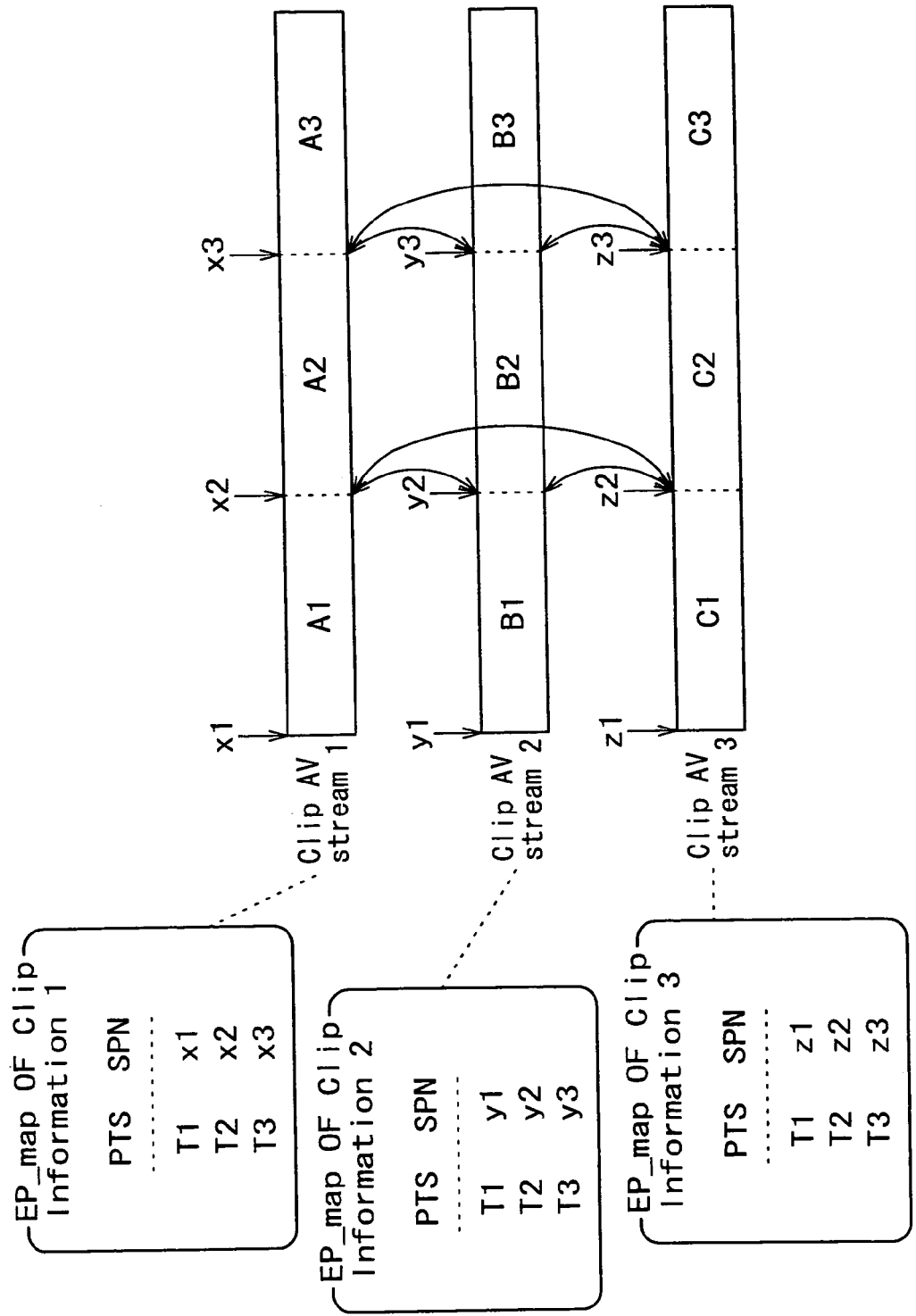
FIG. 7 is a diagram showing data contents of Clip Information files.

FIG. 7 shows data contents of Clip Information files.

Each piece of video stream data in the AV stream data A1, B1, and C1 starts with a Sequence header followed by a Closed GOP. A time stamp for starting display of each piece of video stream data is the same, or T1, and a period of display of each piece of video stream data is the same, or (T1-T2). The Closed GOP is closed within one section (for example the reproducing sections a1, b1, and c1), and is encoded so as to be completed within the section. Of course, as long as the data is encoded so as to be completed within each section, that is, unless there is a predictive relation between one section (for example the reproducing section a1) and another section (for example the reproducing section b1), the data does not need to be a GOP.

Each piece of video stream data in the AV stream data A2, B2, and C2 also starts with a Sequence header followed by a Closed GOP. A time stamp for starting display of each piece of video stream data is the same, or T2, and a period of display of each piece of video stream data is the same, or (T2-T3).

Each piece of video stream data in the AV stream data A3, B3, and C3 also starts with a Sequence header followed by a Closed GOP. A time stamp for starting display of each piece of video stream data is the same, or T3, and a period of display of each piece of video stream data is the same, or (T3-T4). Incidentally, a picture displayed first in the Closed GOP of the video stream data in all of the AV stream data A1, B1, C1, A2, B2, C2, A3, B3, and C3 is an I-picture.

Audio stream data in the AV stream data A1, B1, and C1 is the same. Audio stream data in the AV stream data A2, B2, and C2 is the same. Audio stream data in the AV stream data A3, B3, and C3 is the same.

The AV stream data A1, B1, and C1 includes video packets and audio packets. A first packet of each of the pieces of AV stream data A1, B1, and C1 is a video packet. A payload of the video packet starts with an I-picture following a Sequence header and a GOP header. A first packet of each of the pieces of AV stream data A2, B2, and C2 is also a video packet. A payload of the video packet starts with an I-picture following a Sequence header and a GOP header. A first packet of each of the pieces of AV stream data A3, B3, and C3 is also a video packet. A payload of the video packet starts with an I-picture following a Sequence header and a GOP header.

Incidentally, each of the pieces of AV stream data A1, B1, and C1 may start with a packet including control information such as a PAT (Program Association Table), a PMT (Program Map Table) and the like, and have a video packet as a first subsequent elementary stream packet.

A Clip Information file has an EP_map, which is a map describing correspondences between time stamps of entry points in the Clip and source packet numbers at which to start stream decoding in the Clip AV stream file. Incidentally, the source packet number is incremented by one in order of source packets in an AV stream file (FIG. 4). The source packet number of a first source packet in the file is zero.

Supposing that first packet numbers of the pieces of AV stream data A1, A2, and A3 are x1, x2, and x3, that first packet numbers of the pieces of AV stream data B1, B2, and B3 are y1, y2, and y3, and that first packet numbers of the pieces of AV stream data C1, C2, and C3 are z1, z2, and z3, the EP_maps of Clip Information 1, 2, and 3 have contents as shown in FIG. 7.

In the EP_map of Clip Information 1 of Clip AV stream 1, payloads of source packets indicated by the numbers x1, x2, and x3 start with I-pictures whose time stamps have display start times of T1, T2, and T3, respectively.

In the EP_map of Clip Information 2 of Clip AV stream 2, payloads of source packets indicated by the numbers y1, y2, and y3 start with I-pictures whose time stamps have display start times of T1, T2, and T3, respectively.

In the EP_map of Clip Information 3 of Clip AV stream 3, payloads of source packets indicated by the numbers z1, z2, and z3 start with I-pictures whose time stamps have display start times of T1, T2, and T3, respectively.

Figure 8:
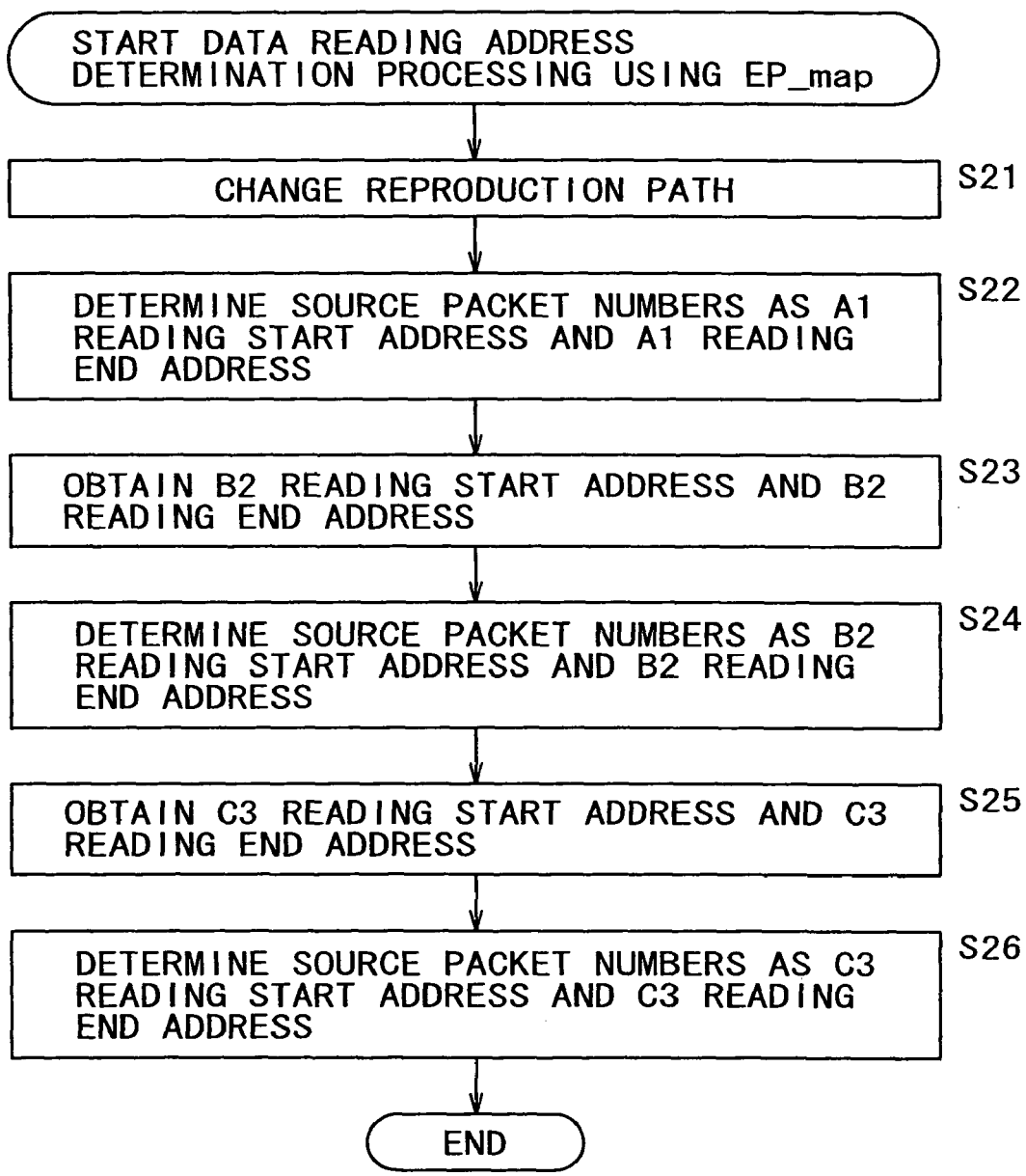
FIG. 8 is a flowchart of assistance in explaining processing for determining data reading addresses using EP_maps.

With reference to a flowchart of FIG. 8, description will next be made of processing for determining data reading addresses using the EP_maps by taking as an example a case of changing angles and thereby reproducing the reproducing section a1 defined by the first PlayItem of Angle#1, the reproducing section b2 defined by the second PlayItem of Angle#2, and the reproducing section c3 defined by the third PlayItem of Angle#3.

In step S21, processing for changing a reproduction path is performed. Specifically, in order to read the AV stream data A1 of the reproducing section corresponding to the reproducing section a1 defined by the first PlayItem of Angle#1, the control unit 23 obtains a reading start address and a reading end address of the AV stream data A1 from the EP_map of Clip 1. In step S22, the control unit 23 reads the source packet number x1 corresponding to the time stamp T1 as the reading start address of the AV stream data A1 from the EP_map, and reads the source packet number x2 corresponding to the time stamp T2 as the reading end address of the AV stream data A1 from the EP_map and further determines a source packet number (x2-1) immediately preceding the source packet number x2 as the reading end address of the AV stream data A1.

In step S23, in order to read the AV stream data B2 of the reproducing section corresponding to the reproducing section b2 defined by the second PlayItem of Angle#2, the control unit 23 obtains a reading start address T2 and a reading end address T3 of the AV stream data B2 from the EP_map of Clip 2. In step S24, the control unit 23 determines the source packet number y2 corresponding to the time stamp T2 as the reading start address of the AV stream data B2, and determines a source packet number (y3-1) immediately preceding the source packet number y3 corresponding to the time stamp T3 as the reading end address of the AV stream data B2.

In step S25, in order to read the AV stream data C3 of the reproducing section corresponding to the reproducing section c3 defined by the third PlayItem of Angle#3, the control unit 23 obtains a reading start address T3 and a reading end address T4 of the AV stream data C3 from the EP_map of Clip 3. In step S26, the control unit 23 determines the source packet number z3 corresponding to the time stamp T3 as the reading start address of the AV stream data C3, and determines a last source packet number of Clip 3 as the reading end address of the AV stream data C3.

Figure 9:
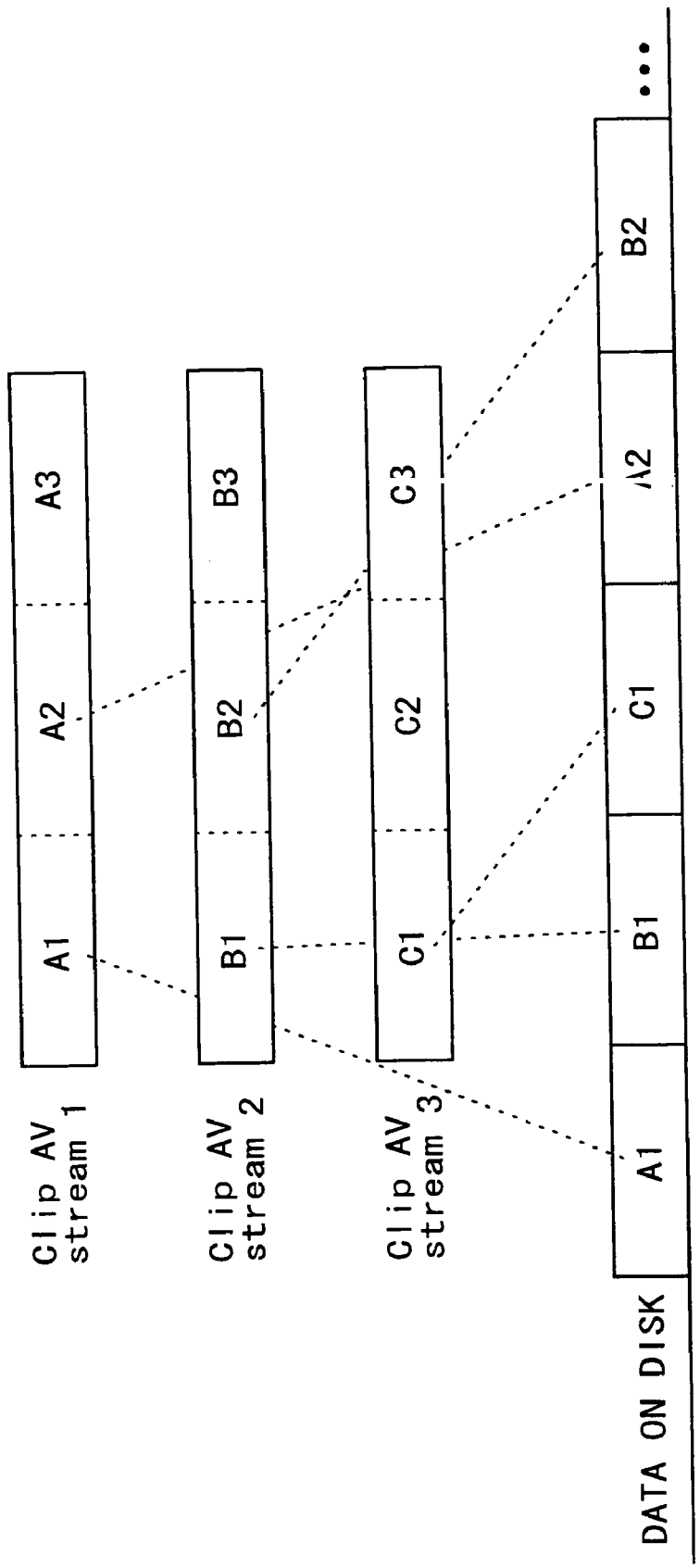
FIG. 9 is a diagram of assistance in explaining a method of multiplexing and recording Clips.

FIG. 9 is a diagram of assistance in explaining a method of multiplexing Clips and recording the Clips on a disk.

When AV stream data corresponding to PlayItems of angles including a multiangle is recorded on the recording medium 100, it is desirable to divide the AV stream data of the angles into pieces of data in predetermined sections, interleave the pieces of data, and then record the pieces of data in such an order as A1, B1, C1, A2, B2, C2, A3, B3, and C3, as shown in FIG. 9. This minimizes a jump time when angle change is made at each PlayItem.

Figure 10:
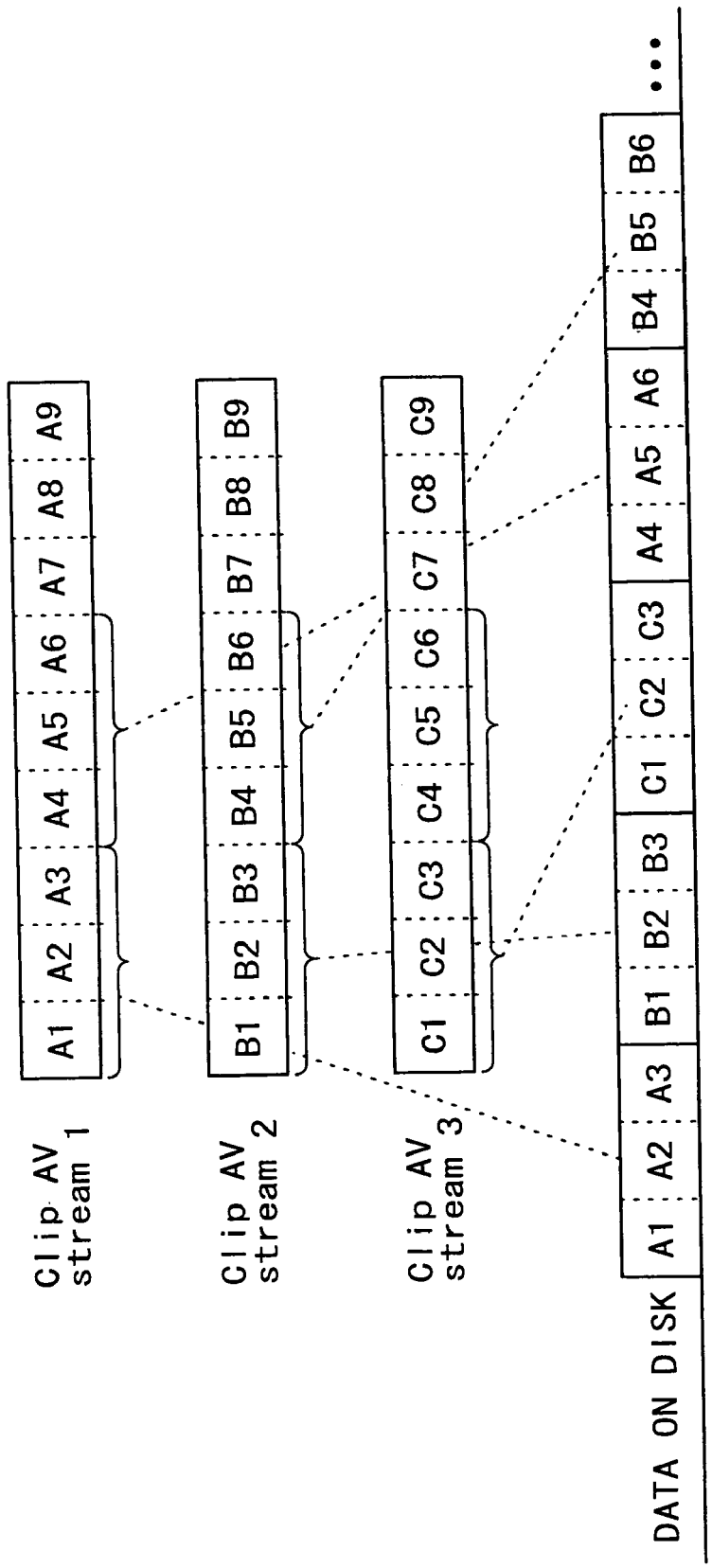
FIG. 10 is a diagram of assistance in explaining a method of multiplexing and recording Clips.

FIG. 10 is a diagram of assistance in explaining another method of multiplexing Clips and recording the Clips on a disk.

When AV stream data corresponding to PlayItems of angles including a multiangle is recorded on the recording medium 100, the AV stream data of the angles is interleaved and recorded in units of a plurality of (in the example of FIG. 10, three) pieces of continuous data in the AV stream data of the same angle (in units of "A1, A2, and A3," "B1, B2, and B3," and "C1, C2, and C3," for example), in such an order as A1, A2, A3, B1, B2, B3, C1, C2, and C3, for example, as shown in FIG. 10. When the AV stream data interleaved and recorded as shown in FIG. 10 is reproduced with angle change, addresses of angle change points (for example source packet numbers x1, x2, x3, . . . corresponding to time stamps T1, T2, T3, . . . as reading start addresses of the AV stream data A1, A2, A3, . . . in FIG. 11) are obtained from EP_maps of the AV streams as in FIG. 7, as shown in FIG. 11.

Thereby, as compared with the example of FIG. 9, although a jump time when angles are changed at each PlayItem is increased, an amount of data for managing the fragmented file data can be reduced. For example, the example of FIG. 10 can reduce the amount of data for managing the fragmented file data to ⅓ as compared with the example of FIG. 9.

Thus, when recording multiangle AV stream data on the recording medium (disk) 100, the user can select the methods of multiplexing and recording Clips as described with reference to FIG. 9 and FIG. 10 in advance according to whether the user gives priority to the access speed of a drive in the reproduction of the recording medium 100 or the amount of data for managing file data, and interleave and record AV stream data of angles by a selected predetermined recording method.

Figure 11:
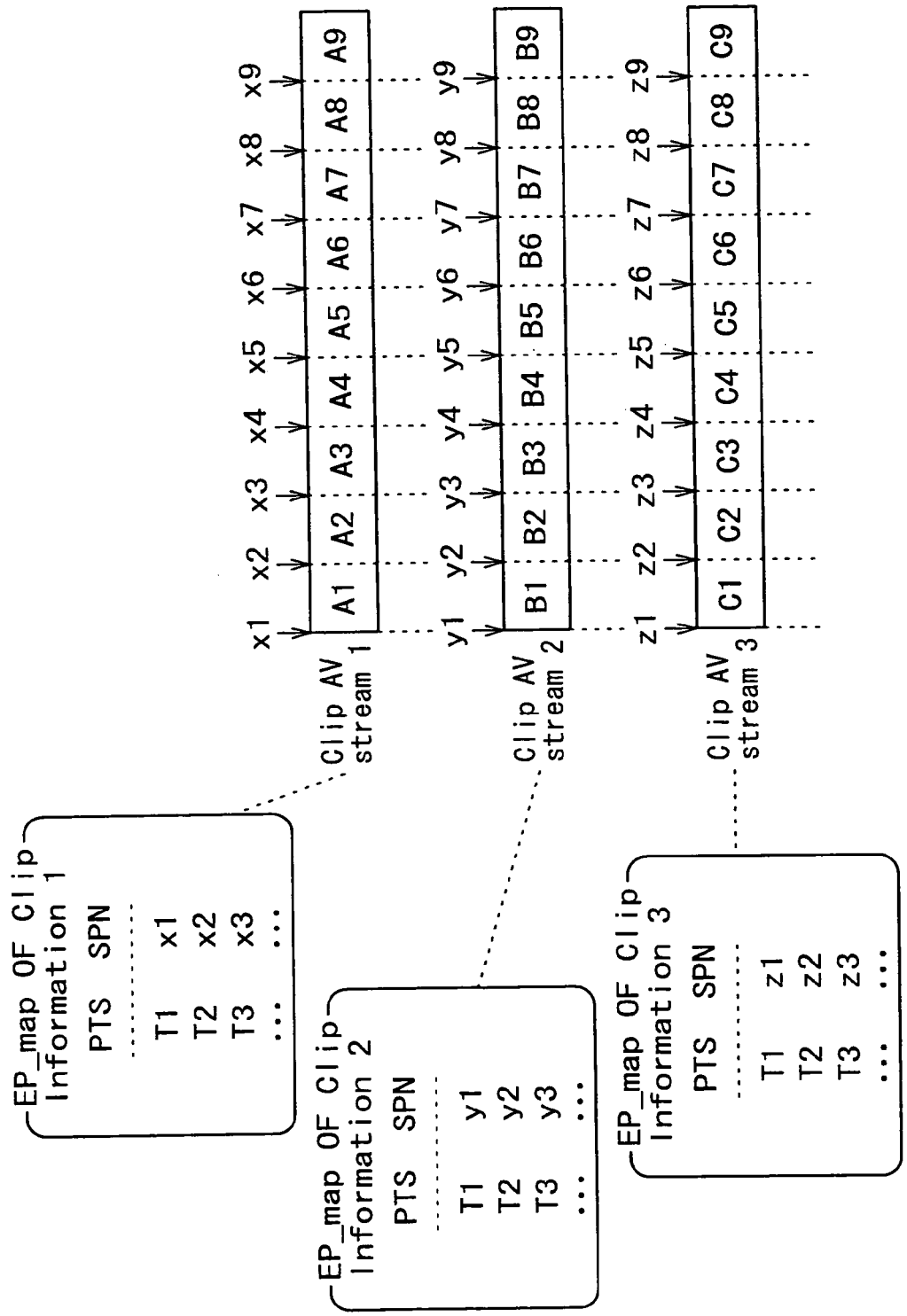
FIG. 11 is a diagram showing data contents of Clip Information files.

In the example of FIG. 11, entry points entered in the EP_maps are all angle change points. When entry points entered in EP_maps include entry points that are not angle change points, for each entry point in the EP_maps, a flag indicating whether the entry point is an angle change point may be recorded in the EP_maps as shown in FIG. 12.

Figure 12:
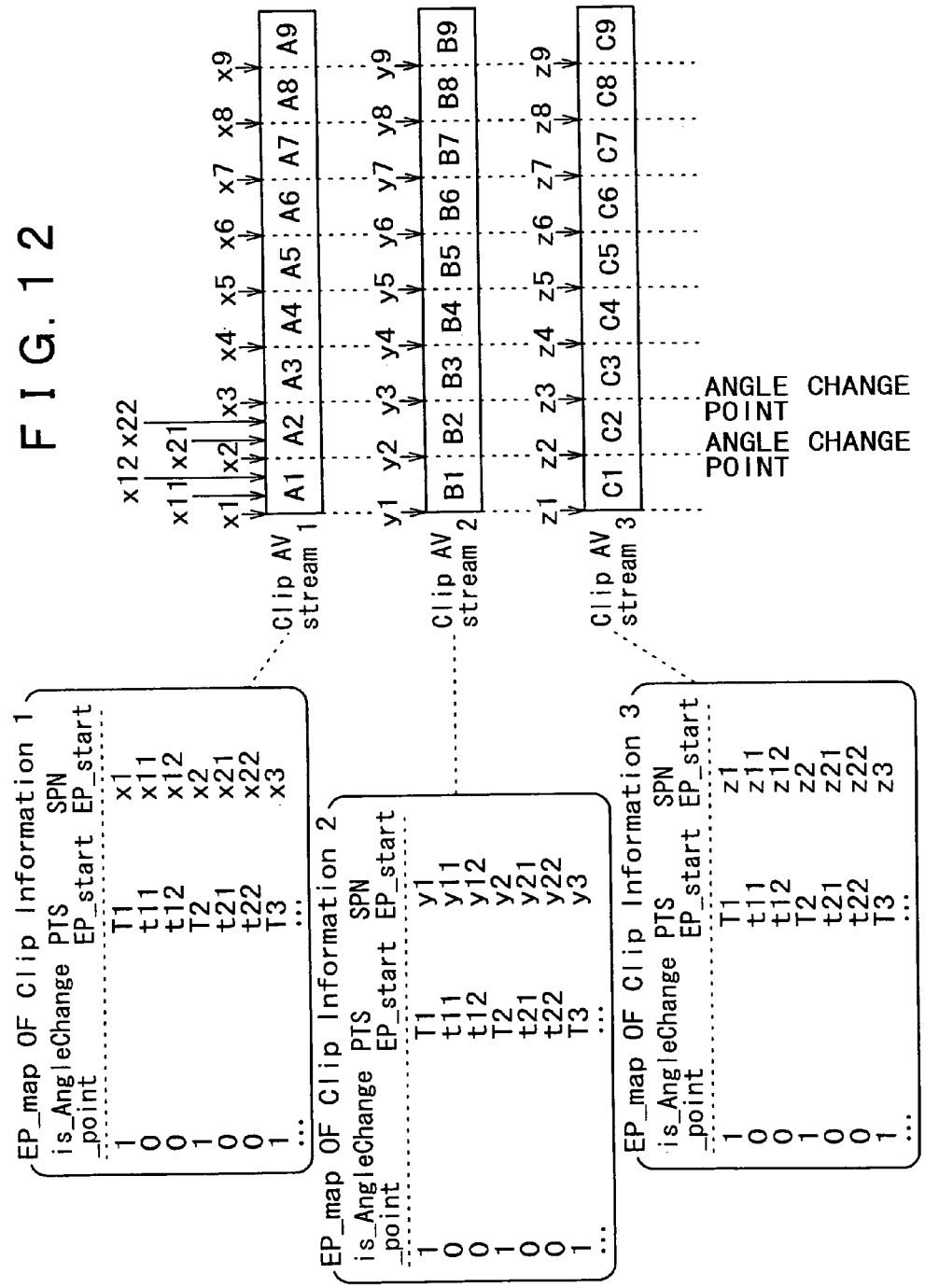
FIG. 12 is a diagram showing data contents of Clip Information files in the case of FIG. 10.

As shown in FIG. 12, each entry point in the EP_map (EP_map of Clip Information 1 in FIG. 12) of Clip 1 (Clip AV stream 1) has field data of is_AngleChange_point, PTS_EP_start, and SPN_EP_start.

The is_AngleChange_point indicates whether angle change is possible at the entry point. The SPN_EP_start indicates a packet number of the entry point. The PTS_EP_start indicates a display start time of the entry point.

For example, entry points whose SPN_EP_start is x1, x2, or x3 allow angle change, and therefore the is_AngleChange_point of the entry points is "1." Entry points whose SPN_EP_start is x11 or x12 do not allow angle change, and therefore the is_AngleChange_point of the entry points is "0." In other words, the is_AngleChange_point means that even when angle change is made at an entry point whose is_AngleChange_point is "0," seamless change is not ensured, that is, continuous supply of AV stream data at a predetermined bit rate is not ensured.

The same applies to the EP_map (EP_map of Clip Information 2 in FIG. 12) of Clip 2 (Clip AV stream 2). Entry points whose SPN_EP_start is y1, y2, or y3 allow angle change, and therefore the is_AngleChange_point of the entry points is "1."

The same applies to the EP_map (EP_map of Clip Information 3 in FIG. 12) of Clip 3 (Clip AV stream 3). Entry points whose SPN_EP_start is z1, z2, or z3 allow angle change, and therefore the is_AngleChange_point of the entry points is "1."

When the AV stream data interleaved and recorded as shown in FIG. 10 is reproduced with angle change, addresses of angle change points (for example the source packet numbers x1, x2, x3, . . . corresponding to time stamps T1, T2, T3, . . . as reading start addresses of the AV stream data A1, A2, A3, . . . in FIG. 12) are obtained from the EP_maps of the AV streams as in FIG. 7, as shown in FIG. 12.

Processing for recording AV signals used in a multiangle onto the recording medium 100 will next be described with reference to a flowchart of FIG. 13.

In step S41, the control unit 23 instructs the user via the user interface 24 to divide a section of each angle for forming the multiangle into a plurality of predetermined sections. On the basis of the instruction, the user inputs an instruction to divide the whole section of each angle by change points. The control unit 23 obtains the instruction. In step S42, the AV encoder 15 encodes a video signal of each of the divided sections into a video stream starting with a Closed GOP, and encodes an audio signal of each of the sections into an audio stream. This encode processing is performed on video signals and audio signals of all angles.

In step S43, the multiplexer 16 multiplexes the video stream and the audio stream of each section into a transport stream of each section. In step S44, the multiplexer 16 interleaves the pieces of AV stream data of the angles in such an order as A1, B1, C1, A2, B2, C2, A3, B3, and C3, for example. The multiplexer 16 performs the multiplexing such that a first packet is a video packet and the video packet starts with an I-picture of a Closed GOP.

In step S45, the source packetizer 19 source-packetizes the transport stream of each predetermined section, and the writing unit 22 records the source-packetized transport stream as an AV stream file onto the recording medium 100. Thereby Clip AV stream files of the angles including the source-packetized and recorded transport stream are generated on the recording medium 100. Incidentally, a video packet ID (PID) of the transport stream is the same in all the angles. An audio packet ID of the transport stream is also the same in all the angles.

In step S46, the multiplexed stream analyzing unit 18 obtains a time stamp of a first I-picture of the transport stream of each section and a packet number of a packet whose payload starts with the I-picture. The control unit 23 adds a set of the time stamp and the packet number to an EP_map (When there is no EP_map, an EP_map is generated).

In step S47, the control unit 23 controls the writing unit 22 to record the EP_map generated for each Clip AV stream file in a predetermined area of the recording medium 100 collectively (in a concentrated manner).

In step S48, the control unit 23 generates PlayLists. In step S49, the control unit 23 controls the writing unit 22 to record PlayList files representing the predetermined sections in the form of PlayItems and having such a data structure in a predetermined area of the recording medium 100 collectively (in a concentrated manner). Incidentally, in the case where entry points entered in the EP_maps include entry points that are not angle change points as shown in FIG. 12, angle change points are set on the basis of flags ("1" and "0") of the EP_maps as shown in FIG. 12 when the control unit 23 generates the PlayLists in step S48.

Figure 14:
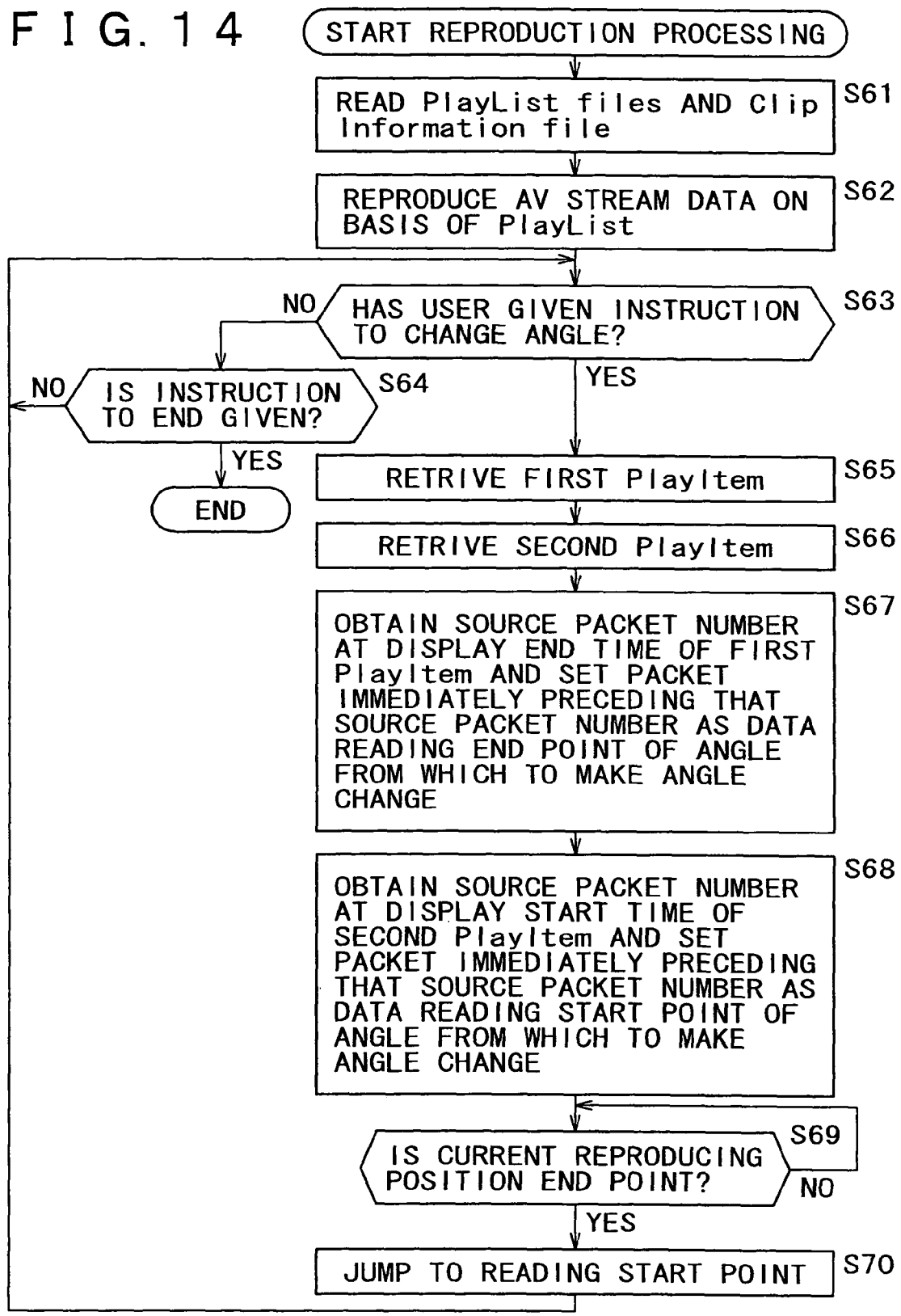
FIG. 14 is a flowchart of assistance in explaining processing for reproducing recorded multiangle AV stream data.

Processing for reproducing the thus recorded multiangle AV stream data will next be described with reference to a flowchart of FIG. 14.

In step S61, the control unit 23 reads all the PlayList files forming the multiangle and the Clip Information file (including the EP_map) of a Clip that each PlayList refers to from the recording medium 100. That is, pre-reading is performed. The EP_maps are recorded collectively, and can therefore be read quickly.

In step S62, on the basis of a PlayList read in the processing of step S61, the control unit 23 sequentially reproduces AV stream data from a position specified by a first PlayItem of the PlayList. In step S63, the control unit 23 determines whether the user has given an instruction to change angles via the user interface 24. When the control unit 23 determines that the user has not given an instruction to change angles, the control unit 23 determines in step S64 whether the user has given an instruction to end the reproduction. When the control unit 23 determines that the user has given an instruction to end the reproduction, the processing is ended. When the control unit 23 determines that the user has not given an instruction to end the reproduction, the processing returns to step S63.

When the control unit 23 determines in step S63 that the user has given an instruction to change angles, the control unit 23 in step S65 retrieves a first PlayItem having a future display end time closest to a present reproduction time in the PlayList corresponding to an angle from which to make the angle change (angle currently being reproduced). When an instruction to change from Angle#1 to Angle#2 is given between the time stamps T1 and T2 in the example of FIG. 5, for example, the PlayItem a1 is the target first PlayItem. In step S66, the control unit 23 retrieves a second PlayItem having the display end time of the first PlayItem as a display start time in a PlayList corresponding to an angle to which to make the angle change. When an instruction to change from Angle#1 to Angle#2 is given between the time stamps T1 and T2 in the example of FIG. 5, for example, the PlayItem b2 is the target second PlayItem.

In step S67, the control unit 23 obtains a source packet number corresponding to the display end time of the first PlayItem by referring to the EP_map of the Clip that the first PlayItem refers to, and sets a source packet immediately preceding the source packet number as a data reading end point of the angle from which to make the angle change.

In step S68, the control unit 23 obtains a source packet number corresponding to the display start time of the second PlayItem by referring to the EP_map of the Clip that the second PlayItem refers to, and sets a source packet of the source packet number as a data reading start point of the angle to which to make the angle change.

In step S69, the control unit 23 determines whether the present reproducing position is the end point calculated in the processing of step S67. When the present reproducing position is not the end point, the control unit 23 stands by until the present reproducing position reaches the end point. When the present reproducing position reaches the end point, the processing proceeds to step S70, where the control unit 23 jumps the reproducing position to the start point calculated in the processing of step S68. Thereafter the processing returns to step S63 to repeat the processing from step S63 on down.

Figure 15:
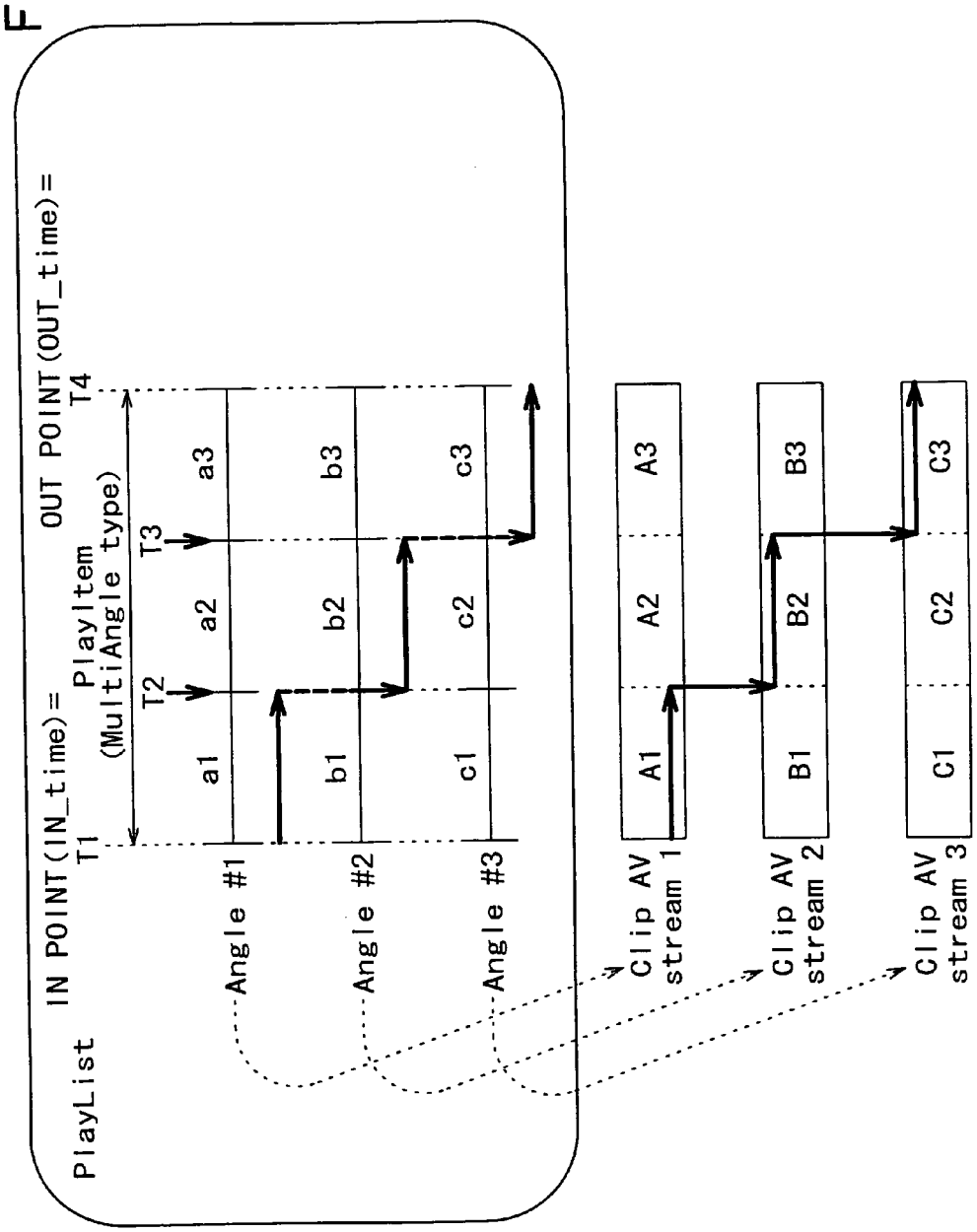
FIG. 15 is a diagram showing an example of structure of a PlayList.

FIG. 15 shows another example of a PlayList including a multiangle.

In the example of FIG. 15, there is one multiangle PlayList, and there is one PlayItem in the PlayList. The PlayItem has three pieces of information, for example. The first piece of information is information (specifying information) on AV streams used in multiangle reproduction to which streams to make reference. For example, in the example of FIG. 15, Clip AV stream 1, Clip AV stream 2, and Clip AV stream 3 are streams to which to make reference. Thus, the specifying information (pointer) specifies them. The second piece of information is an IN point (IN_time) and an OUT point (OUT_time) that indicate a time section of the multiangle reproduction. In the example of FIG. 15, IN_time=T1 and OUT_time=T4. The third piece of information is times of entry points representing angle change points in the time section of the multiangle reproduction. In the example of FIG. 15, the times are T2 and T3.

FIG. 16 shows a syntax of the PlayItem in FIG. 15.

A Clip_information_file_name represents AV streams used in the multiangle reproduction to which streams to make reference. An IN_time and an OUT_time represent the time section of the multiangle reproduction. An entry_time [i] is the time of an entry point allowing angle change in the time section of the multiangle reproduction. Of course, also in the case of the PlayItem in FIG. 15 and FIG. 16, the three EP_maps described with reference to FIG. 7 are all used as they are for conversion from time to data addresses.

Figure 13:
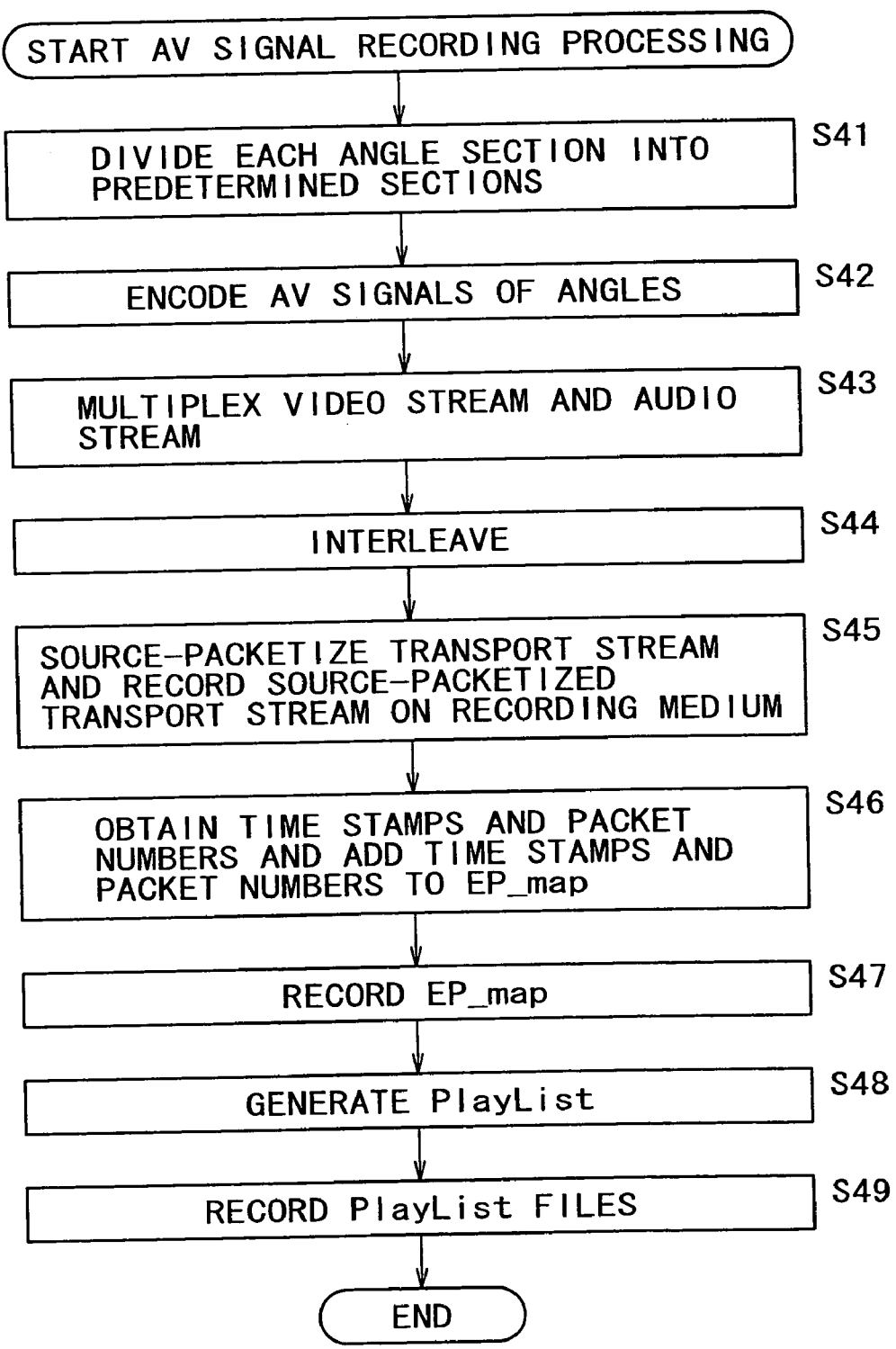
FIG. 13 is a flowchart of assistance in explaining processing for recording AV signals used in a multiangle.

Processing for recording AV signals used for the multiangle onto the recording medium 100 in the case where the PlayList and the PlayItem are formed as shown in FIG. 15 and FIG. 16 is the same as in the case represented by the flowchart of FIG. 13, and therefore description thereof will be omitted. In this example, however, the PlayLists generated in step S48 and recorded in step S49 are the PlayList file having the data structure that indicates the time of an entry point allowing angle change by the entry_time [i].

Figure 17:
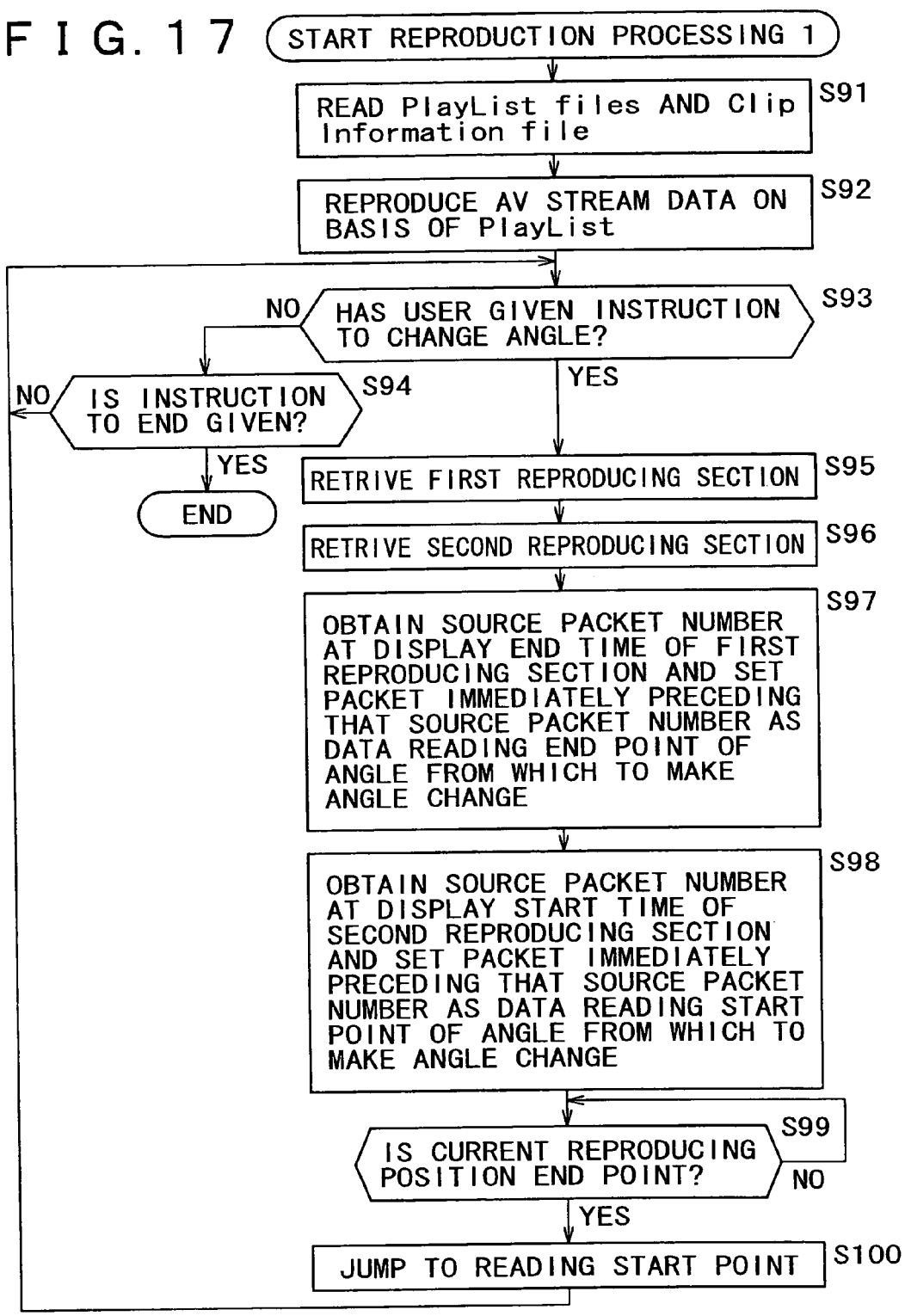
FIG. 17 is a flowchart of assistance in explaining reproduction processing 1 for reproducing recorded multiangle AV stream data.

Reproduction processing 1 for reproducing the recorded multiangle in this example is as shown in FIG. 17. Processing from step S91 to step S100 is basically the same as the processing from step S61 to step S70 in FIG. 14. However, the control unit 23 detects a first reproducing section in the PlayItem instead of the first PlayItem in step S95, and detects a second reproducing section in the PlayItem instead of the second PlayItem in step S96. When an instruction to change from Angle#1 to Angle#2 is given between time stamps T1 and T2 in the example of FIG. 15, for example, the first reproducing section is a reproducing section a1, and the second reproducing section is a reproducing section b2.

In step S97, the control unit 23 obtains a source packet number corresponding to the display end time of a section corresponding to the first reproducing section by referring to the EP_map of a Clip that the section corresponding to the first reproducing section refers to. In step S98, the control unit 23 obtains a source packet number corresponding to the display start time of a section corresponding to the second reproducing section by referring to the EP_map of a Clip that the section corresponding to the second reproducing section refers to. The other processing is the same as in FIG. 14, and therefore description thereof will be omitted. Incidentally, a non-seamless signal that does not ensure seamlessness may be mixed with a seamless signal within a multiangle.

Figure 18:
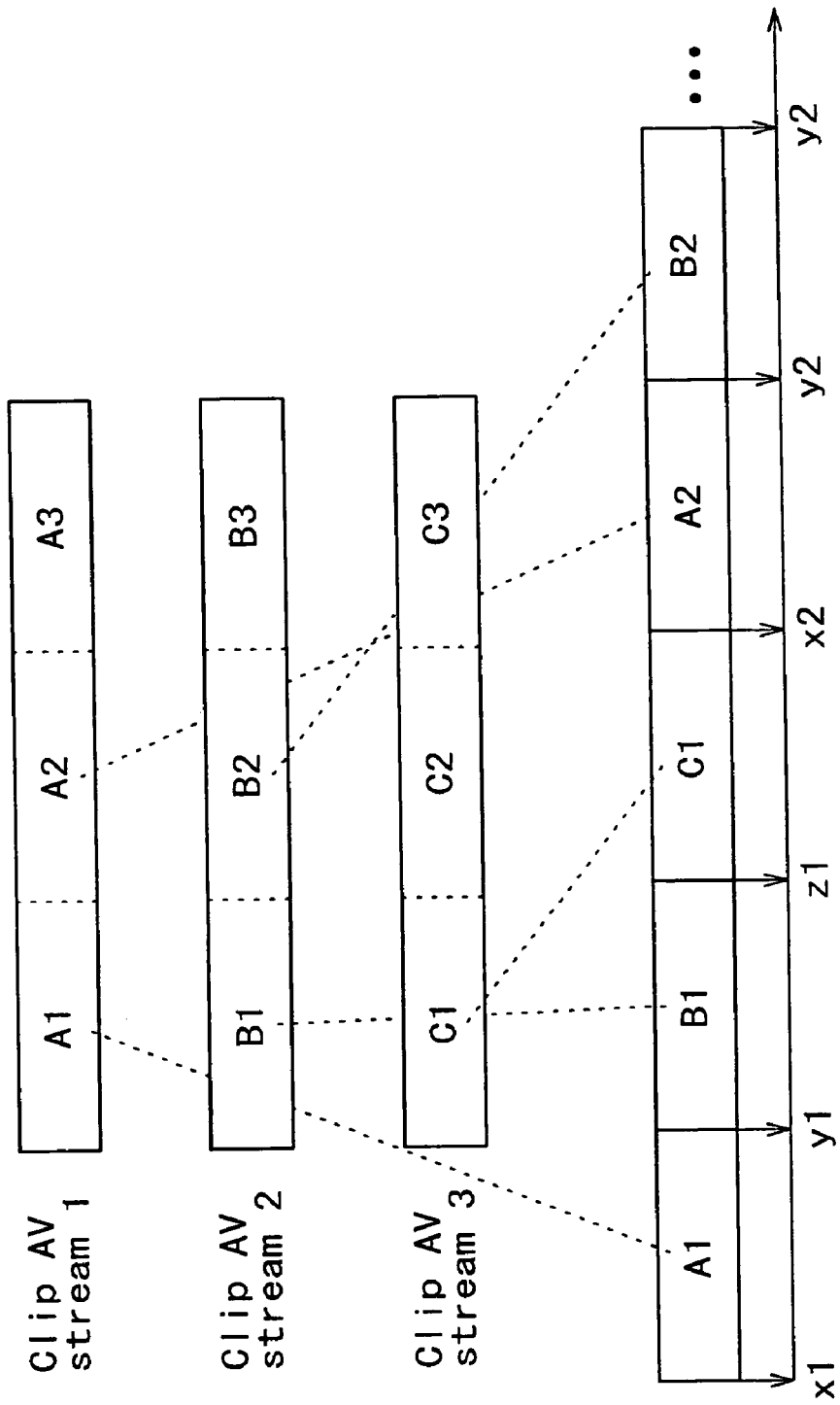
FIG. 18 is a diagram showing an example of another structure of an AV stream file.

FIG. 18 shows an example of another structure of an AV stream file. In the cases of FIG. 7 and FIG. 15, an EP_map (in the example of FIG. 7, the EP_map of Clip Information 1 for Clip AV stream 1, the EP_map of Clip Information 2 for Clip AV stream 2, and the EP_map of Clip Information 3 for Clip AV stream 3) is attached to each of Clip AV stream 1, Clip AV stream 2, and Clip AV stream 3. In the case of FIG. 18, on the other hand, one EP_map is attached to three Clip AV streams (that is, Clip AV stream 1, Clip AV stream 2, and Clip AV stream 3), for example.

In the example of FIG. 18, the AV stream file is interleaved in order of data pieces A1, B1, C1, A2, B2, C2, A3, B3, and C3. A source packet number in the AV stream file is assigned to each source packet in the AV stream file sequentially (x1, y1, z1, x2, y2, z2, x3, y3, z3 in the example of FIG. 18) for each Clip AV stream (Clip AV stream 1, Clip AV stream 2, and Clip AV stream 3).

Each of pieces of video stream data in the pieces of AV stream data A1, B1, C1, A2, B2, C2, A3, B3, and C3 in FIG. 18 may include two or more GOPs. In such a case, a second GOP and subsequent GOPs may be GOPs that are not Closed GOPs (non-Closed GOPs). However, encoding needs to be completed within each piece of AV stream data (for example the AV stream data A1). Suppose that the video stream data of the AV stream data A1 includes one Closed GOP and two non-Closed GOPs, for example. In this case, as shown in FIG. 19, source packet numbers x1, x11, and x12, for example, are assigned in the AV stream file, and source packets of the source packet numbers x11 and x12 correspond to the two non-Closed GOPs, respectively.

Figure 19:
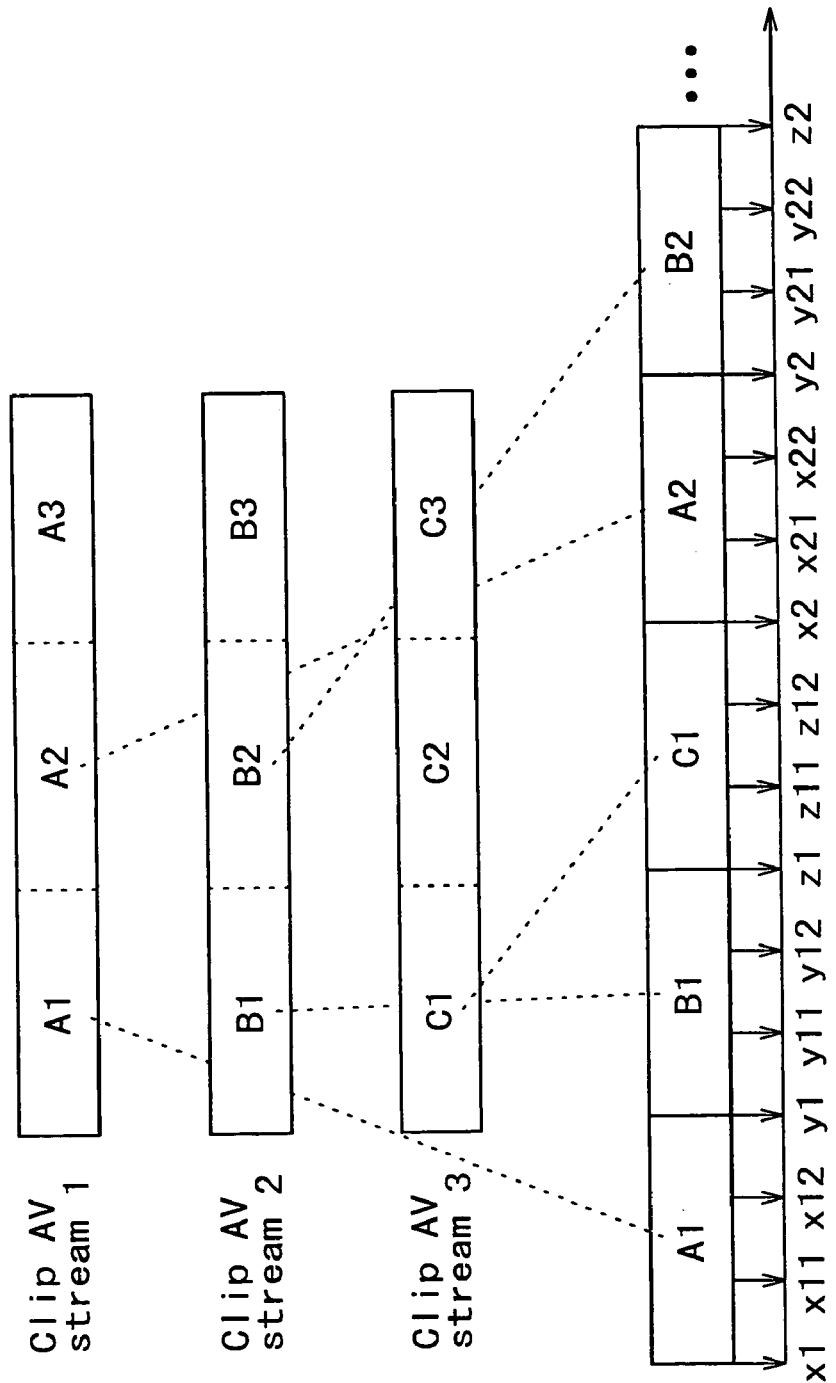
FIG. 19 is a diagram showing an example of another structure of an AV stream file.

In the example of FIG. 19, the video stream data of the piece of AV stream data B1 includes one Closed GOP and two non-Closed GOPs. Source packet numbers y1, y11, and y12 are assigned in the AV stream file, and source packets of the source packet numbers y11 and y12 are source packets of the two non-Closed GOPs, respectively.

The video stream data of the piece of AV stream data C1 includes one Closed GOP and two non-Closed GOPs. Source packet numbers z1, z11, and z12 are assigned in the AV stream file, and source packets of the source packet numbers z11 and z12 are source packets of the two non-Closed GOPs, respectively.

The same applies to the video stream data of the pieces of AV stream data A2, B2, C2, A3, B3, and C3 in FIG. 19.

Figure 20:
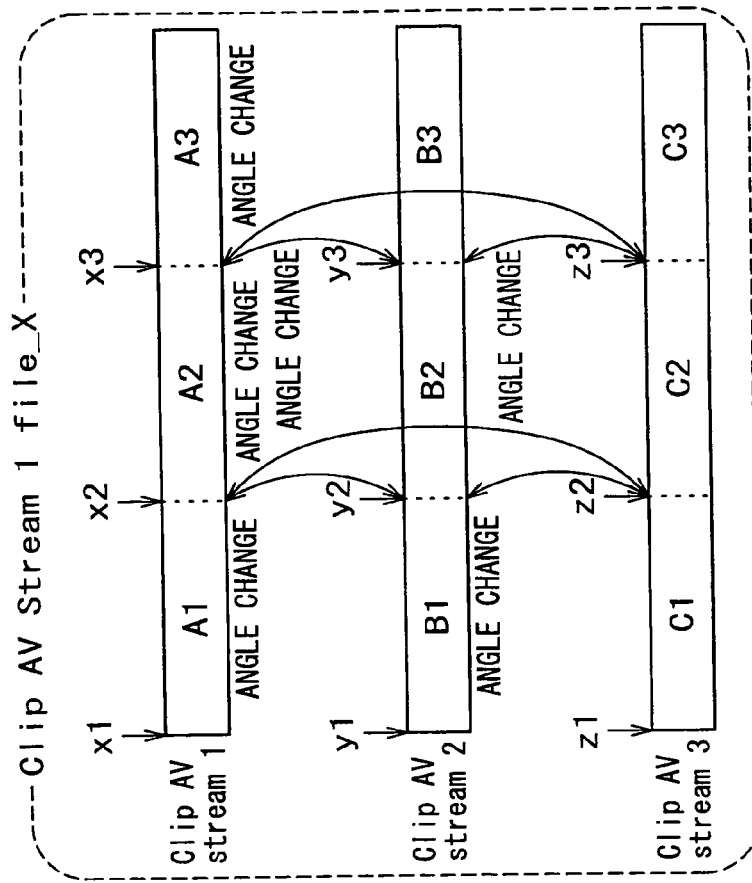
FIG. 20 is a diagram showing data contents of a Clip Information file in the case of FIG. 19.

FIG. 20 shows data contents of a Clip Information file in the case of FIG. 19. Contents of the AV stream data A1, B1, C1, A2, B2, C2, A3, B3, and C3 are basically the same as in FIG. 7, and therefore description thereof will be omitted.

As shown in FIG. 20, the Clip Information file attached to the AV stream file (Clip AV stream file X) has an EP_map, which is a map describing correspondences between time stamps of entry points in the Clip and source packet numbers at which to start stream decoding in the Clip AV stream file.

Each entry point in the EP_map has field data of is_AngleChange_point, Angle_number, PTS_EP_start, and SPN_EP_start. The is_AngleChange_point indicates whether angle change is possible at the entry point. The Angle_number indicates an angle number to which the entry point belongs. The SPN_EP_start indicates a packet number of the entry point. The PTS_EP_start indicates a display start time of the entry point.

For example, entry points whose SPN_EP_start is x1, x2, or x3 allow angle change, and therefore the is_AngleChange_point of the entry points is "1." Entry points whose SPN_EP_start is x11 or x12 do not allow angle change, and therefore the is_AngleChange_point of the entry points is "0." In other words, the is_AngleChange_point means that even when angle change is made at an entry point whose is_AngleChange_point is "0," seamless change is not ensured, that is, continuous supply of AV stream data at a predetermined bit rate is not ensured. The same applies to entry points whose SPN_EP_start is y11, y12, z11 or z12.

Figure 21:
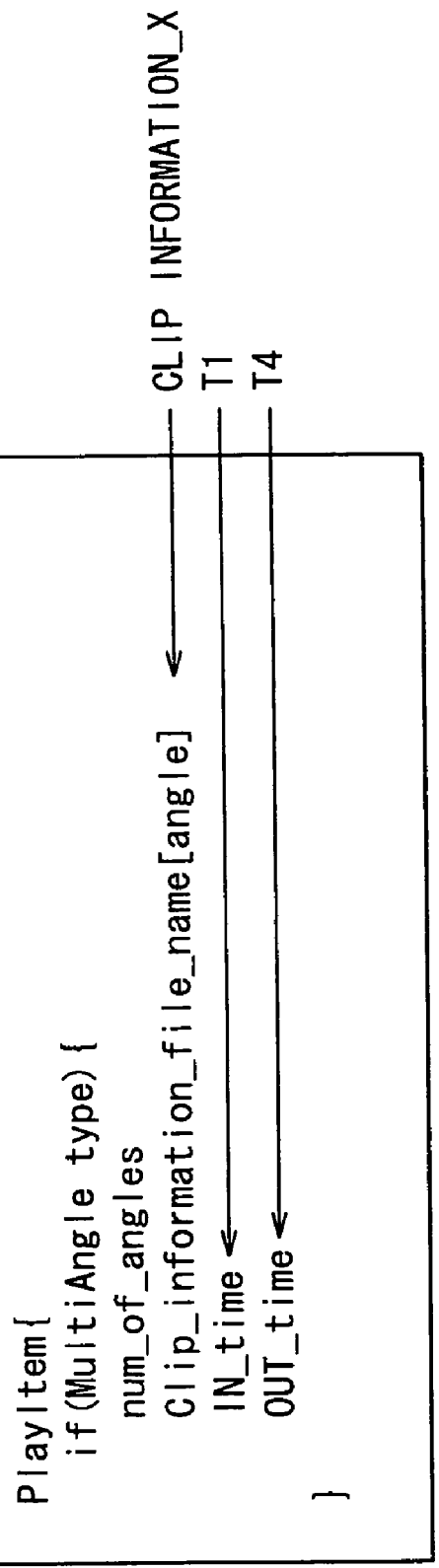
FIG. 21 is a diagram showing a syntax of a PlayItem in managing a Clip AV stream file in FIG. 20.

FIG. 21 shows a syntax of a PlayItem when the Clip AV stream file is managed in FIG. 20. A Clip_information file_name represents AV streams used in multiangle reproduction to which streams to make reference (Clip_information_X in the example of FIG. 21). An IN_time (T1 in the example of FIG. 21) and an OUT_time (T4 in the example of FIG. 21) represent a start point and an end point of a time section of the multiangle reproduction. Of course, in the case of the PlayItem of FIG. 21, the EP_map described with reference to FIG. 20 is used for conversion from time to data addresses.

Thus, since Clip 1, Clip 2, and Clip 3 are treated as one file, fragmentation of file data can be prevented, and therefore an amount of data in managing the data of the AV stream file can be reduced as compared with FIG. 7.

With reference to a flowchart of FIG. 22, description will next be made of processing for determining data reading addresses using the EP_map in FIG. 20 by taking as an example a case of changing angles and thereby reproducing a reproducing section a1 defined by a first PlayItem of Angle#1, a reproducing section b2 defined by a second PlayItem of Angle#2, and a reproducing section c3 defined by a third PlayItem of Angle#3.

In step S121, in order to read the AV stream data A1 of the reproducing section corresponding to the reproducing section a1 defined by the first PlayItem of Angle#1, the control unit 23 obtains a reading start address and a reading end address of the AV stream data A1 from data of entry points of Angle_number=1 in the EP_map in FIG. 20. In step S122, the control unit 23 reads the source packet number x1 corresponding to a time stamp T1 as the reading start address of the AV stream data A1 from the EP_map. In addition, the control unit 23 reads the source packet number y1 corresponding to a time stamp T1 of Angle_number=2 from the EP_map and further determines a source packet number (y1-1) immediately preceding the source packet number y1 as the reading end address of the piece of AV stream data A1.

In step S123, in order to read the AV stream data B2 of the reproducing section corresponding to the reproducing section b2 defined by the second PlayItem of Angle#2, the control unit 23 obtains a reading start address and a reading end address of the AV stream data B2 from data of entry points of Angle_number=2 in the EP_map in FIG. 20. In step S124, the control unit 23 in step S123 reads the source packet number y2 corresponding to a time stamp T2 as the reading start address of the AV stream data B2 from the EP_map. In addition, the control unit 23 reads the source packet number z2 corresponding to a time stamp T2 of Angle_number=3 from the EP_map and further determines a source packet number (z2-1) immediately preceding the source packet number z2 as the reading end address of the piece of AV stream data B2.

In step S125, in order to read the AV stream data C3 of the reproducing section corresponding to the reproducing section c3 defined by the third PlayItem of Angle#3, the control unit 23 obtains a reading start address and a reading end address of the AV stream data C3 from data of entry points of Angle_number=3 in the EP_map in FIG. 20. In step S126, the control unit 23 reads the source packet number z3 corresponding to a time stamp T3 as the reading start address of the AV stream data C3 from the EP_map. In addition, the control unit 23 determines a last source packet number of Angle_number=3 as the reading end address of the piece of AV stream data C3.

Figure 23:
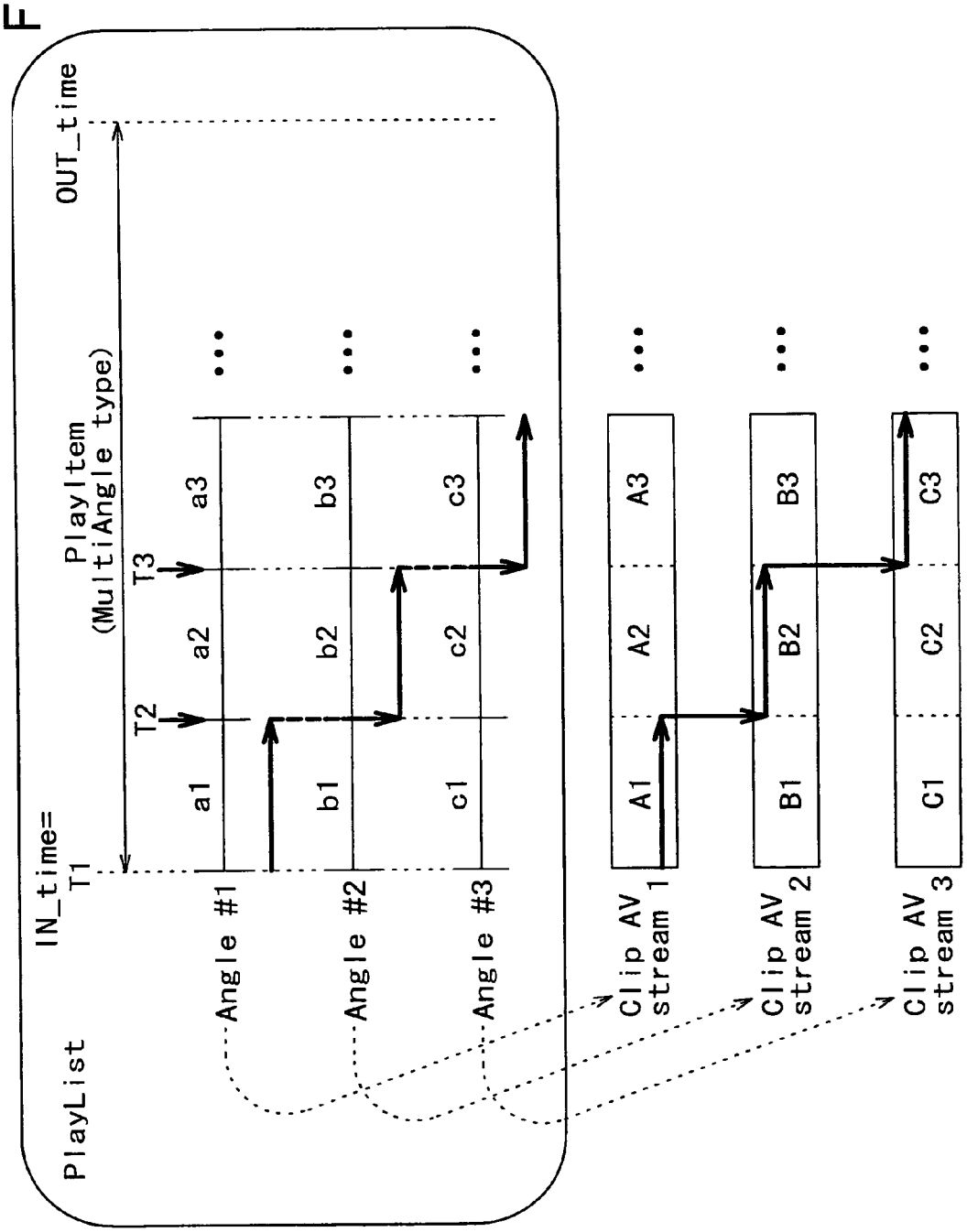
FIG. 23 is a diagram of assistance in explaining another method of multiplexing and recording Clips.

FIG. 23 shows another example of a PlayList forming a multiangle. The PlayList shown in FIG. 23 is different from the PlayList of FIG. 15.

The PlayList in the example of FIG. 23 includes a multiangle type PlayItem. The PlayItem has two pieces of information, for example. The first piece of information is information (specifying information) on AV streams used in multiangle reproduction to which streams to make reference. For example, in the example of FIG. 23, Clip AV stream 1, Clip AV stream 2, and Clip AV stream 3 are streams to which to make reference. Thus, the specifying information (pointer) specifies them. The second piece of information is an IN point (IN_time) and an OUT point (OUT_time) that indicate a time section of the multiangle reproduction. In the example of FIG. 23, the IN point is IN_time=T1 and the OUT point is OUT_time. The IN_time and the OUT_time are shared by a plurality of AV streams used in the multiangle reproduction.

A method of interleaving and recording Clips is basically the same as described with reference to FIG. 10.

Specifically, when AV stream data corresponding to PlayItems of angles including the multiangle is recorded on the recording medium 100, the AV stream data of the angles is interleaved and recorded in units of a plurality of (in the example of FIG. 10, three) pieces of continuous data in the AV stream data of the same angle (in units of "A1, A2, and A3," "B1, B2, and B3," and "C1, C2, and C3," for example), in such an order as A1, A2, A3, B1, B2, B3, C1, C2, and C3, for example, as shown in FIG. 10. When the AV stream data interleaved and recorded as shown in FIG. 10 is reproduced with angle change, addresses of angle change points (for example source packet numbers x1, x2, x3, . . . corresponding to time stamps T1, T2, T3, . . . as reading start addresses of the AV stream data A1, A2, A3, . . . as described with reference to FIG. 12) are obtained from EP_maps of the AV streams, as shown in FIG. 12.

As shown in FIG. 12, each entry point in the EP_map (EP_map of Clip Information 1 in FIG. 12) of Clip 1 (Clip AV stream 1) has field data of is_AngleChange_point, PTS_EP_start, and SPN_EP_start.

The is_AngleChange_point indicates whether angle change is possible at the entry point. The SPN_EP_start indicates a packet number of the entry point. The PTS_EP_start indicates a display start time of the entry point.

For example, entry points whose SPN_EP_start is x1, x2, or x3 allow angle change, and therefore the is_AngleChange_point of the entry points is "1." Entry points whose SPN_EP_start is x11 or x12 do not allow angle change, and therefore the is_AngleChange_point of the entry points is "0." In other words, the is_AngleChange_point means that even when angle change is made at an entry point whose is_AngleChange_point is "0," seamless change is not ensured, that is, continuous supply of AV stream data at a predetermined bit rate is not ensured.

The same applies to the EP_map (EP_map of Clip Information 2 in FIG. 12) of Clip 2 (Clip AV stream 2). Entry points whose SPN_EP_start is y1, y2, or y3 allow angle change, and therefore the is_AngleChange_point of the entry points is "1."

The same applies to the EP_map (EP_map of Clip Information 3 in FIG. 12) of Clip 3 (Clip AV stream 3). Entry points whose SPN_EP_start is z1, z2, or z3 allow angle change, and therefore the is_AngleChange_point of the entry points is "1."

FIG. 24 shows a syntax of the PlayItem in FIG. 23.

A Clip_information_file_name represents the AV streams used in multiangle reproduction to which streams to make reference. An IN_time and an OUT_time represent the time section of the multiangle reproduction.

Processing for recording AV signals used in the multiangle onto the recording medium 100 in the case described with reference to FIG. 23 and FIG. 24 is basically the same as described with reference to FIG. 13.

Specifically, the control unit 23 instructs the user via the user interface 24 to divide a section of each angle for forming the multiangle into a plurality of predetermined sections. On the basis of the instruction, the user inputs an instruction to divide the whole section of each angle by change points. The control unit 23 obtains the instruction. The AV encoder 15 encodes a video signal of each of the divided sections into a video stream starting with a Closed GOP, and encodes an audio signal of each of the sections into an audio stream. This encode processing is performed on video signals and audio signals of all angles.

The multiplexer 16 multiplexes the video stream and the audio stream of each section into a transport stream of each section. The multiplexer 16 interleaves the AV stream data of the angles in a manner as shown in FIG. 10, for example. The multiplexer 16 performs the multiplexing such that a first packet is a video packet and the video packet starts with an I-picture of a Closed GOP.

The source packetizer 19 source-packetizes the transport stream of each predetermined section, and the writing unit 22 records the source-packetized transport stream as an AV stream file onto the recording medium 100. Thereby Clip AV stream files of the angles including the source-packetized and recorded transport stream are generated on the recording medium 100. Incidentally, a video packet ID (PID) of the transport stream is the same in all the angles. An audio packet ID of the transport stream is also the same in all the angles.

Then, the multiplexed stream analyzing unit 18 obtains a time stamp of a first I-picture of the transport stream of each section and a packet number of a packet whose payload starts with the I-picture. The control unit 23 adds a set of the time stamp and the packet number to an EP_map (When there is no EP_map, an EP_map is generated).

Then, the control unit 23 controls the writing unit 22 to record the EP_map generated for each Clip AV stream file in a predetermined area of the recording medium 100 collectively (in a concentrated manner).

The control unit 23 generates a PlayList. Thereafter, the control unit 23 controls the writing unit 22 to record a PlayList file representing the predetermined sections in the form of a PlayItem and having such a data structure in a predetermined area of the recording medium 100 collectively (in a concentrated manner). Incidentally, in the case where entry points entered in the EP_maps include entry points that are not angle change points as shown in FIG. 12, angle change points are set on the basis of flags ("1" and "0") of the EP_maps as shown in FIG. 12 when the control unit 23 generates the PlayList.

Reproduction processing 2 for reproducing the recorded multiangle in the example of FIG. 23 and FIG. 24 will next be described with reference to FIG. 25.

In step S141, the control unit 23 reads the PlayList file and the Clip Information files (including the EP_maps) of a plurality of Clips that the multiangle type PlayItem included in the PlayList refers to from the recording medium 100. That is, pre-reading is performed. The EP_maps are recorded collectively, and can therefore be read quickly.

In step S142, on the basis of the multiangle type PlayItem included in the PlayList read in the processing of step S141, the control unit 23 reproduces AV stream data. In step S143, the control unit 23 determines whether the user has given an instruction to change angles via the user interface 24. When the control unit 23 determines that the user has not given an instruction to change angles, the control unit 23 determines in step S144 whether the user has given an instruction to end the reproduction. When the control unit 23 determines that the user has given an instruction to end the reproduction, the processing is ended. When the control unit 23 determines that the user has not given an instruction to end the reproduction, the processing returns to step S143.

When the control unit 23 determines in step S143 that the user has given an instruction to change angles, the control unit 23 in step S145 retrieves a first reproducing section having a future display end time closest to a present reproduction time in reproducing sections of a Clip AV stream corresponding to an angle from which to make the angle change (angle currently being reproduced). When an instruction to change from Angle#1 to Angle#2 is given between the time stamps T1 and T2 in the example of FIG. 23, for example, a reproducing section a1 is the target first reproducing section. This is derived from the fact that the is_AngleChange_point at each of T1 and T2 in the EP_map of the Clip of Angle#1 is set to "1."

In step S146, the control unit 23 retrieves a second reproducing section having the display end time of the first reproducing section as a display start time in reproducing sections of a Clip AV stream corresponding to an angle to which to make the angle change. When an instruction to change from Angle#1 to Angle#2 is given between the time stamps T1 and T2 in the example of FIG. 23, for example, a reproducing section b2 is the target second reproducing section. This is derived from the fact that the is_AngleChange_point at each of T2 and T3 in the EP_map of the Clip of Angle#2 is set to "1."

In step S147, the control unit 23 obtains a source packet number corresponding to the display end time of the first reproducing section by referring to the EP_map of the Clip that the first reproducing section refers to, and sets a source packet immediately preceding the source packet number as a data reading end point of the angle from which to make the angle change.

In step S148, the control unit 23 obtains a source packet number corresponding to the display start time of the second reproducing section by referring to the EP_map of the Clip that the second reproducing section refers to, and sets a source packet of the source packet number as a data reading start point of the angle to which to make the angle change.

In step S149, the control unit 23 determines whether the present reproducing position is the end point calculated in the processing of step S147. When the present reproducing position is not the end point, the control unit 23 stands by until the present reproducing position reaches the end point. When the present reproducing position reaches the end point, the processing proceeds to step S150, where the control unit 23 jumps the reproducing position to the start point calculated in the processing of step S148. Thereafter the processing returns to step S143 to repeat the processing from step S143 on down.

The series of processes described above can be carried out not only by hardware but also by software. In this case, the recording and reproducing apparatus 1 is formed by a personal computer as shown in FIG. 26, for example.

Figure 26:
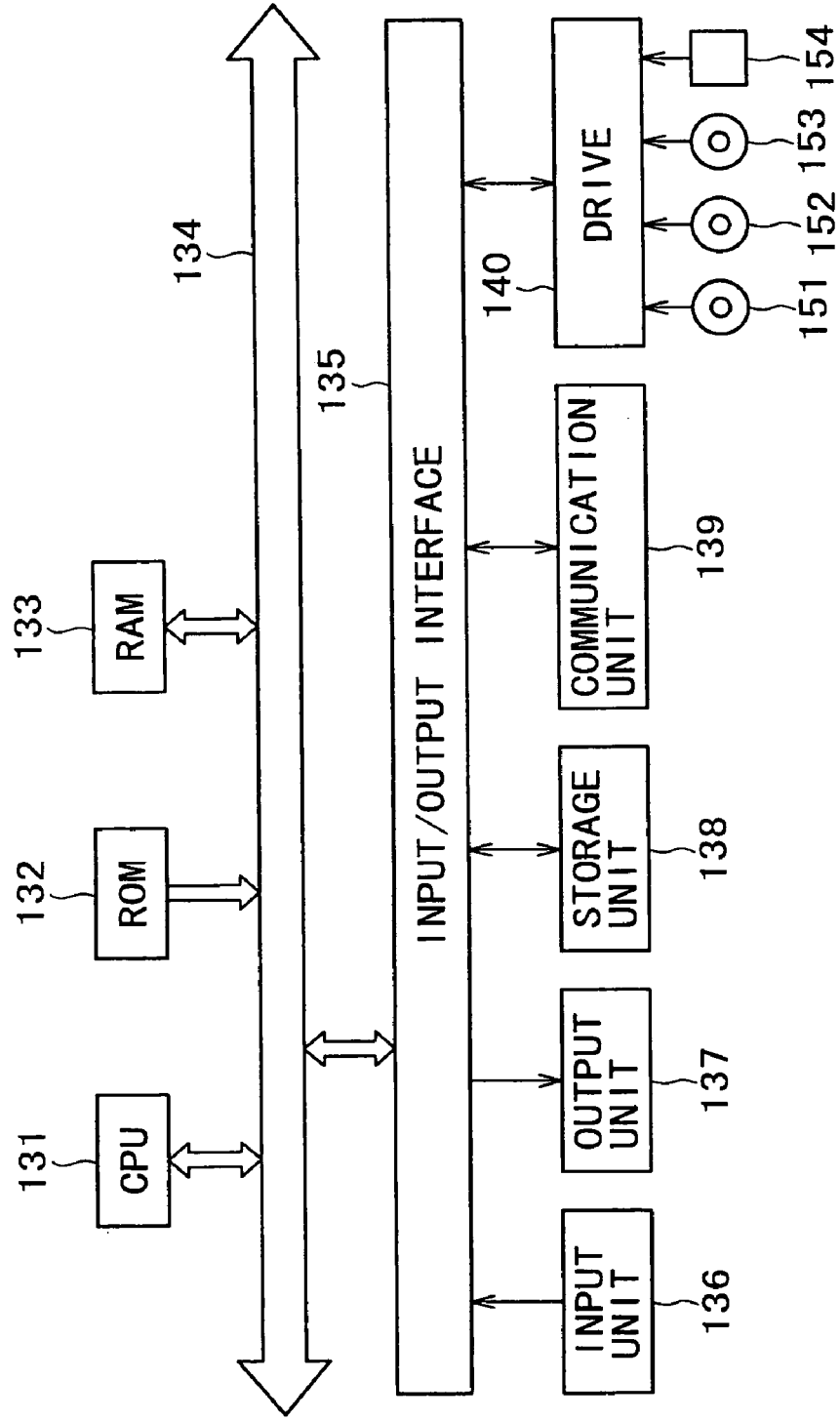
FIG. 26 is a block diagram showing an example of configuration of a personal computer.

A CPU 131 in FIG. 26 performs various processing according to a program stored in a ROM 132 or a program loaded from a storage unit 138 into a RAM 133. The RAM 133 also stores data and the like necessary for the CPU 131 to perform various processing, as required.

The CPU 131, the ROM 132, and the RAM 133 are interconnected via a bus 134. The bus 134 is also connected with an input-output interface 135.

The input-output interface 135 is connected with an input unit 136 including a keyboard, a mouse and the like, an output unit 137 including a display formed by a CRT (Cathode-Ray Tube), an LCD (Liquid Crystal Display) or the like as well as a speaker, a storage unit 138 including a hard disk or the like, and a communicating unit 139 including a modem, a terminal adapter or the like. The communicating unit 139 performs communication processing via a network including the Internet (not shown).

When necessary, the input-output interface 135 is also connected with a drive 140, into which a magnetic disk 151, an optical disk 152, a magneto-optical disk 153, a semiconductor memory 154 or the like is inserted as required. A computer program read from the magnetic disk 151, the optical disk 152, the magneto-optical disk 153, the semiconductor memory 154 or the like is installed in the storage unit 138 as required.

As shown in FIG. 26, a program storing medium for storing the program installed in the computer and set in a state of being executable by the computer is formed by a packaged medium including the magnetic disk 151 (including flexible disks), the optical disk 152 (including CD-ROM (Compact Disk-Read Only Memory) and DVD (Digital Versatile Disk)), the magneto-optical disk 153 (including MD (Mini-Disk)), the semiconductor memory 154 or the like, or is formed by the ROM 132, the hard disk including the storage unit 138, or the like, which stores the program temporarily or permanently. The program is stored on the program storing medium using a wireless or wire communication medium such as a local area network, the Internet, digital satellite broadcasting or the like via an interface such as a router, a modem or the like, as required.

It is to be noted that in the present specification, the steps describing the program stored on the program storing medium include not only processing carried out in time series in the described order but also processing carried out in parallel or individually and not necessarily in time series. The present invention is applicable to cases where AV streams are recorded or reproduced on recording media such as Blu-ray Discs, CD-Rs, and other optical disks as well as DVDs, MDs and other magneto-optical disks, magnetic disks and the like.

In addition, while the present invention is applied to angle change in multiangle recording and reproduction in the embodiment of the present invention, the present invention is applicable to reproduction paths for a multistory or rating control, for example.

When the recording medium 100 for recording or reproducing AV streams in FIG. 2 is a disk type recording medium such as a CD-R or another optical disk as well as a DVD, an MD or another magneto-optical disk, or a magnetic disk, for example, information is recorded thereon by forming pits or marks on the basis of recording waveforms of data on a "track" set concentrically or spirally on a surface of the disk.

On a medium that is pressed to record data, such as a CD-ROM, a DVD-ROM and the like, for example, pits, or physical depressions are actually formed on the surface. On the other hand, in the case of a write-once or rewritable medium such as a CD-R, a CD-RW, a DVD-R, a DVD-RW, a DVD-RAM or the like, for example, marks, which are a substitute for the physical depressions, are formed by applying laser light and thereby making the heat produce chemical change in a phase change film within the medium, instead of forming the depressions.

When recorded data is reproduced, laser light irradiated from a head to read the data is reflected on the surface of the medium. At this time, presence or absence of the pits or marks causes change in the reflected light, whereby the data is reproduced.

Methods of recognizing the recorded data includes a mark position recording method in which presence and absence of pits represent bit data and a mark edge recording method in which presence of a pit inverts the bit.

The latter method recognizes a pit read at a constant reflectance as "0," and a pit in which the reflectance is changed as "1." The method contributes to reducing pit length and track loss in recording data.

Incidentally, a method of recording or reproducing information on the disk type recording medium such as the magnetic disk 151, the optical disk 152, the magneto-optical disk 153, the ROM 132, or the hard disk including the storage unit 138 described with reference to FIG. 26 is the same as in the case where the recording medium 100 in FIG. 2 is a disk type recording medium.

INDUSTRIAL APPLICABILITY

According to the present invention, AV signals can be recorded and reproduced. In addition, information on addresses where data of each reproduction path is stored can be obtained quickly. It thereby becomes easier to read in advance information on addresses where data of each reproduction path to be reproduced is stored.

The invention claimed is:

1. An information processing apparatus for recording AV streams onto a recording medium comprising:
   encoding means for generating each of said AV streams forming a plurality of reproduction paths;
   managing information generating means for generating managing information including map information indicating positions of entry points of each of said AV streams and reproduction managing information indicating reproduction path change points set on the basis of said entry points included in said map information; and
   recording means for recording said AV streams and said managing information onto said recording medium,
   wherein said managing information generating means generates a correspondence table describing correspondences between packet numbers and presentation time stamps of said entry points as said map information, wherein:
   said encoding means performs encoding such that a video stream of each section starting at said reproduction path change point is a Closed GOP starting with an I-picture and a first packet is a video packet, and
   said AV streams generated by said encoding means are included in a transport stream.

2. An information processing apparatus as claimed in claim 1, wherein said encoding means sets an identical value as a video packet ID of the transport stream and an identical value as an audio packet ID of the transport stream in all the reproduction paths.

3. An information processing apparatus for recording AV streams onto a recording medium comprising:
   encoding means for generating each of said AV streams forming a plurality of reproduction paths;

managing information generating means for generating managing information including map information indicating positions of entry points of each of said AV streams and reproduction managing information indicating reproduction path change points set on the basis of said entry points included in said map information; and recording means for recording said AV streams and said managing information onto said recording medium, wherein said managing information generating means generates a correspondence table describing correspondences between packet numbers and presentation time stamps of said entry points as said map information, wherein said managing information generating means generates said map information and said reproduction managing information regarding the AV streams generated one for each of said reproduction paths separately for each of said reproduction paths, said apparatus further comprising source-packetizing means for source-packetizing said transport stream of each section, wherein said recording means records said transport stream of each section source-packetized by said source-packetizing means as an AV stream file onto said recording medium.

4. An information processing apparatus for reproducing AV streams from a recording medium on which said AV streams, map information for managing an entity of said AV streams, and reproduction managing information for managing reproduction of said AV streams are recordable, said information processing apparatus comprising:

reading means for reading said reproduction managing information given to each reproduction path having each section divided by a reproduction path change point of said AV stream as a unit, and reading said map information including a correspondence table describing a correspondence between a packet number and a presentation time stamp of said change point of said AV stream;

reproducing means for reproducing said AV streams recorded on said recording medium on the basis of said reproduction managing information read by said reading means;

retrieving means for, when an instruction to make a reproduction path change is given, retrieving said reproduction managing information of a reproduction path from which to make the reproduction path change and said reproduction managing information of a reproduction path to which to make the reproduction path change;

first obtaining means for obtaining a reproduction end position of said AV stream of the reproduction path from which to make the reproduction path change on the basis of said reproduction managing information of the reproduction path from which to make the reproduction path change and said correspondence table of the reproduction path from which to make the reproduction path change;

second obtaining means for obtaining a reproduction start position of said AV stream of the reproduction path to which to make the reproduction path change on the basis of said reproduction managing information of the reproduction path to which to make the reproduction path change and said correspondence table of the reproduction path to which to make the reproduction path change; and control means for controlling said reproducing means to move a reproducing point at said reproduction end position to said reproduction start position.

5. An information processing method of an information processing apparatus for reproducing AV streams from a recording medium on which said AV streams, map information for managing an entity of said AV streams, and reproduction managing information for managing reproduction of said AV streams are recordable, said information processing method comprising:

a reading step for reading said reproduction managing information given to each reproduction path having each section divided by a reproduction path change point of said AV stream as a unit, and reading said map information including a correspondence table describing a correspondence between a packet number and a presentation time stamp of said change point of said AV stream;

a reproducing step for reproducing said AV streams recorded on said recording medium on the basis of said reproduction managing information read by processing of said reading step;

a retrieving step for, when an instruction to make a reproduction path change is given, retrieving said reproduction managing information of a reproduction path from which to make the reproduction path change and said reproduction managing information of a reproduction path to which to make the reproduction path change;

a first obtaining step for obtaining a reproduction end position of said AV stream of the reproduction path from which to make the reproduction path change on the basis of said reproduction managing information of the reproduction path from which to make the reproduction path change and said correspondence table of the reproduction path from which to make the reproduction path change;

a second obtaining step for obtaining a reproduction start position of said AV stream of the reproduction path to which to make the reproduction path change on the basis of said reproduction managing information of the reproduction path to which to make the reproduction path change and said correspondence table of the reproduction path to which to make the reproduction path change; and a control step for controlling processing of said reproducing step to move a reproducing point at said reproduction end position to said reproduction start position.

6. An information processing apparatus for recording AV streams onto a recording medium comprising:

encoding means for generating each of said AV streams forming a plurality of reproduction paths;

managing information generating means for generating managing information including map information indicating a start point of said AV stream of each reproduction path and positions of entry points of said AV stream, and reproduction managing information including the start point and an end point of said AV stream, reproduction path change points included in said entry points included in said map information, and specifying information for specifying the AV stream of each reproduction path; and recording means for recording said AV streams and said managing information onto said recording medium, wherein said managing information generating means generates a correspondence table describing correspondences between packet numbers and presentation time stamps of said entry points as said map information, said encoding means performs encoding such that a video stream of each section starting at said reproduction path change point is a Closed GOP starting with an I-picture and a first packet is a video packet, and said AV streams generated by said encoding means are included in a transport stream.

7. An information processing apparatus as claimed in claim 6, wherein said encoding means performs encoding such that a start of the video stream of each section is said Closed GOP and a subsequent part of the video stream of each section is a non-Closed GOP.

8. An information processing apparatus for recording AV streams onto a recording medium comprising:
encoding means for generating each of said AV streams forming a plurality of reproduction paths;
managing information generating means for generating managing information including map information indicating a start point of said AV stream of each reproduction path and positions of entry points of said AV stream, and reproduction managing information including the start point and an end point of said AV stream, reproduction path change points included in said entry points included in said map information, and specifying information for specifying the AV stream of each reproduction path; and
recording means for recording said AV streams and said managing information onto said recording medium,
wherein said managing information generating means generates a correspondence table describing correspondences between packet numbers and presentation time stamps of said entry points as said map information,
wherein said managing information generating means generates said map information and said reproduction managing information regarding the AV streams generated one for each of said reproduction paths separately for each of said reproduction paths,
said apparatus further comprising source-packetizing means for source-packetizing said transport stream of each section,
wherein said recording means records said transport stream of each section source-packetized by said source-packetizing means as an AV stream file onto said recording medium.

9. An information processing apparatus as claimed in claim 8, wherein said managing information generating means generates one said correspondence table to be included in said map information, said correspondence table corresponding to said AV stream file.

10. An information processing apparatus for reproducing AV streams from a recording medium on which said AV streams, map information for managing an entity of said AV streams, and reproduction managing information for managing reproduction of said AV streams are recordable, said information processing apparatus comprising:
reading means for reading said reproduction managing information including a reproduction path change point of said AV streams, a start point and an end point of said AV streams, and specifying information for specifying the AV stream of each reproduction path, and reading said map information including a correspondence table describing correspondences between packet numbers and presentation time stamps of said start point and said change point of said AV streams;
reproducing means for reproducing said AV streams recorded on said recording medium on the basis of said reproduction managing information read by said reading means;
retrieving means for, when an instruction to make a reproduction path change is given, retrieving said section of a reproduction path from which to make the reproduction path change and said section of a reproduction path to which to make the reproduction path change;
first obtaining means for obtaining a reproduction end position of said AV stream of the reproduction path from which to make the reproduction path change on the basis of said section of the reproduction path from which to make the reproduction path change and said correspondence table of the reproduction path from which to make the reproduction path change;
second obtaining means for obtaining a reproduction start position of said AV stream of the reproduction path to which to make the reproduction path change on the basis of said section of the reproduction path to which to make the reproduction path change and said correspondence table of the reproduction path to which to make the reproduction path change; and
control means for controlling said reproducing means to move a reproducing point at said reproduction end position to said reproduction start position.

11. An information processing method of an information processing apparatus for reproducing AV streams from a recording medium on which said AV streams, map information for managing an entity of said AV streams, and reproduction managing information for managing reproduction of said AV streams are recordable, said information processing method comprising:
a reading step for reading said reproduction managing information including a reproduction path change point of said AV streams, a start point and an end point of said AV streams, and specifying information for specifying the AV stream of each reproduction path, and reading said map information including a correspondence table describing correspondences between packet numbers and presentation time stamps of said start point and said change point of said AV streams;
a reproducing step for reproducing said AV streams recorded on said recording medium on the basis of said reproduction managing information read by processing of said reading step;
a retrieving step for, when an instruction to make a reproduction path change is given, retrieving said section of a reproduction path from which to make the reproduction path change and said section of a reproduction path to which to make the reproduction path change;
a first obtaining step for obtaining a reproduction end position of said AV stream of the reproduction path from which to make the reproduction path change on the basis of said section of the reproduction path from which to make the reproduction path change and said correspondence table of the reproduction path from which to make the reproduction path change;
a second obtaining step for obtaining a reproduction start position of said AV stream of the reproduction path to which to make the reproduction path change on the basis of said section of the reproduction path to which to make the reproduction path change and said correspondence table of the reproduction path to which to make the reproduction path change; and
a control step for controlling processing of said reproducing step to move a reproducing point at said reproduction end position to said reproduction start position.

* * * * *